United States Patent
Ozawa et al.

(10) Patent No.: US 9,817,485 B2
(45) Date of Patent: Nov. 14, 2017

(54) DISPLAY CONTROL DEVICE, METHOD, AND PROGRAM

(75) Inventors: Ken Ozawa, Kanagawa (JP); Masanori Iwasaki, Kanagawa (JP); Hideaki Mogi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 213 days.

(21) Appl. No.: 14/116,387

(22) PCT Filed: May 9, 2012

(86) PCT No.: PCT/JP2012/061859
§ 371 (c)(1),
(2), (4) Date: Nov. 8, 2013

(87) PCT Pub. No.: WO2012/157486
PCT Pub. Date: Nov. 22, 2012

(65) Prior Publication Data
US 2014/0062882 A1    Mar. 6, 2014

(30) Foreign Application Priority Data
May 17, 2011   (JP) ................................ 2011-110363

(51) Int. Cl.
*G06F 3/03*    (2006.01)
*G06F 3/038*   (2013.01)
(Continued)

(52) U.S. Cl.
CPC ............ *G06F 3/0304* (2013.01); *G06F 3/038* (2013.01); *G06T 3/40* (2013.01); *G06T 7/246* (2017.01);
(Continued)

(58) Field of Classification Search
CPC ........ G06F 3/0304; G06F 3/033; G06F 3/038; G06T 2207/10016; G06T 2207/10024;
(Continued)

(56) References Cited

U.S. PATENT DOCUMENTS

| | | | |
|---|---|---|---|
| 5,448,261 A | 9/1995 | Koike et al. | |
| 6,535,198 B1* | 3/2003 | Fan ............................... | 345/158 |

(Continued)

FOREIGN PATENT DOCUMENTS

| | | |
|---|---|---|
| JP | HEI 06-059807 | 3/1994 |
| JP | HEI 06-075695 | 3/1994 |

(Continued)

OTHER PUBLICATIONS

Extended European Search Report issued in related EP patent application No. EP 12786774 dated Oct. 7, 2014.

*Primary Examiner* — Hong Zhou
(74) *Attorney, Agent, or Firm* — Dentons US LLP

(57) ABSTRACT

The present technique relates to a display control device, a method, and a program that can improve user's operability of a free-cursor type user interface.
An imaging unit outputs an RGB image based on a pixel signal corresponding to a visible light among light input through a lens and an IR image based on a pixel signal corresponding to an infrared light among light input through the lens. An ROI set unit sets a movement area of an infrared light source in the IR image based on the RGB image, and a display control unit controls a cursor movement amount on a display unit according to movement of the infrared light source in the movement area. The present technique can be applied to a television set that monitors a viewing condition of a viewer, for example.

17 Claims, 33 Drawing Sheets

(51) Int. Cl.
*G06T 3/40* (2006.01)
*H04N 21/422* (2011.01)
*H04N 21/4223* (2011.01)
*H04N 21/44* (2011.01)
*G06T 7/246* (2017.01)

(52) U.S. Cl.
CPC ... *H04N 21/4223* (2013.01); *H04N 21/42221* (2013.01); *H04N 21/44008* (2013.01); *G06T 2207/10016* (2013.01); *G06T 2207/10024* (2013.01); *G06T 2207/10048* (2013.01); *G06T 2207/30196* (2013.01); *G06T 2207/30204* (2013.01)

(58) Field of Classification Search
CPC . G06T 2207/10048; G06T 2207/30196; G06T 2207/30204; G06T 3/40; G06T 7/2033; G06T 7/246; H04N 21/4223; H04N 21/42221; H04N 21/44008; H04N 9/045; H04N 13/0253; H04N 5/332; H04N 9/083; H04N 2209/045; H04N 5/2254; H01L 27/14621; H01L 27/14645
USPC .......... 345/157–158; 382/115, 118; 348/553, 348/601
See application file for complete search history.

(56) References Cited

U.S. PATENT DOCUMENTS

| | | | |
|---|---|---|---|
| 8,525,785 B1* | 9/2013 | Henty et al. | 345/158 |
| 2002/0123666 A1* | 9/2002 | Matsumoto | A61B 1/043 600/178 |
| 2003/0128187 A1 | 7/2003 | Strubbe | |
| 2004/0207597 A1* | 10/2004 | Marks | 345/156 |
| 2006/0132660 A1* | 6/2006 | Kurumisawa | 348/631 |
| 2007/0273766 A1* | 11/2007 | Wilson | G01S 3/7864 348/169 |
| 2008/0067330 A1* | 3/2008 | Yamamoto | G01J 3/51 250/226 |
| 2008/0174551 A1* | 7/2008 | Ishibashi | 345/158 |
| 2008/0177185 A1* | 7/2008 | Nakao | G06K 9/2018 600/476 |
| 2008/0252641 A1* | 10/2008 | Masumoto | A61B 6/08 345/424 |
| 2010/0056277 A1 | 3/2010 | Marks et al. | |
| 2010/0066855 A1* | 3/2010 | Suzuki et al. | 348/222.1 |
| 2010/0141770 A1* | 6/2010 | Gomi | 348/164 |
| 2010/0200752 A1* | 8/2010 | Lee | H04N 5/2254 250/330 |
| 2010/0289885 A1* | 11/2010 | Lu et al. | 348/61 |
| 2011/0128362 A1* | 6/2011 | Shi et al. | 348/77 |
| 2012/0087645 A1* | 4/2012 | Wu | H04N 5/33 396/439 |

FOREIGN PATENT DOCUMENTS

| | | |
|---|---|---|
| JP | HEI 09-284666 | 10/1997 |
| JP | 2007-186915 | 7/2007 |
| JP | 2008-108918 | 5/2008 |
| JP | 2010-230776 | 10/2010 |
| JP | 2012-128766 | 7/2012 |
| WO | WO 2007/013652 A1 | 2/2007 |

\* cited by examiner

DISPLAY CONTROL DEVICE, METHOD, AND PROGRAM

TECHNICAL FIELD

The present technique relates to a display control device, a method, and a program, more particularly, a display control device, a method and a program which can improve user's portability of a free-cursor type user interface.

BACKGROUND ART

In a recent digital television set, since displayed information or operation items are increased in addition to the broadcast pictures, the number of operation buttons of a remote controller increases and operation becomes complicated.

In a view of this problem, a free-cursor type user interface has been proposed, in which an infrared-transparent filter that blocks a visible light and transmits a near-infrared light is provided at a lens part of a digital camera to take an image of a near-infrared light spot of the remote controller of the operator and to allow a selection of menu icons or the like on the display by moving a cursor on the display in conjunction with the movement of the operator's hand (see Patent Document 1, for example).

Recently, a digital camera is mounted to a display device including a display, such as a personal computer or a television set to enable so-called video communication in which a user has a conversation with a person apart using a display via a network such as the Internet or to add an energy saving function for monitoring a viewing condition of a viewer and turning off the power when the viewer is absent in front of the display for a long time.

When it is assumed that a free-cursor type interface of above described Patent Document 1 is applied to such display device and a single focus camera which does not include an optical zoom function but can reduce the cost is used as the infrared camera (hereinafter, simply referred to as a camera) for taking the infrared light spot of the remote controller, a camera imaging area becomes larger as a distance from the camera to the operator increases. In other words, the ratio of the imaging area of the camera and the display size changes according to the distance from the camera to the operator, and an arm stroke amount required when the operator holds the remote controller to operate the cursor changes.

The arm stroke amount of the operator is preferable to be constant regardless of the distance from the camera to the operator in a view of operability. It is thus proposed to change a ratio (magnification ratio) between an amount of displacement of the infrared light spot in the image taken by the camera and an amount of displacement of the cursor displayed on the display, according to the distance between the camera and the operator (see Patent Document 2, for example).

In this case, it is required to accurately obtain the distance between the camera and the operator; however, in Patent Document 2, the distance between the camera and the operator (remote controller) is obtained by using that an intensity of an infrared light of the remote controller changes inversely proportional to the square of the distance.

CITATION LIST

Patent Documents

Patent Document 1: Japanese Patent Application Laid-Open No. 6-59807
Patent Document 2: Japanese Patent Application Laid-Open No. 6-75695

SUMMARY OF THE INVENTION

Problems to be Solved by the Invention

However, in the method of Patent Document 2, the intensity of the infrared light changes due to a deterioration with age of a remaining level of a battery that drives the LED (Light Emitting Diode) which emits an infrared light in the remote controller. Further, the intensity of the infrared light also remarkably changes when the operator swings the remote controller with an angle with respect to the camera. In this manner, it is difficult to accurately obtain the distance between the camera and the operator and, to accurately obtain the distance between the camera and operator based on the intensity of the infrared light, the remote controller has to be placed to face to the camera and calibration has to be performed each time. This may trouble the users.

The present technique has been made in view of such a situation and can improve user's operability of a free-cursor type user interface.

Solutions to Problems

The display control device of an aspect of the present technique is a display control device including: an imaging unit configured to output a visible light image based on a pixel signal corresponding to a visible light among light input though a lens and an infrared light image based on a pixel signal corresponding to an infrared light among light input though the lens; an area set unit configured to set a movement area of an infrared light source in the infrared light image based on the visible light image; and a display control unit configured to control a cursor movement amount on a display unit according to movement of the infrared light source in the movement area.

The area set unit sets a size of the movement area of the infrared light source in the infrared light image based on a subject in the visible light image and makes a position of the infrared light source to be always at the center of the movement area in the infrared light image.

The display control device further includes a face detection unit configured to detect a face of the subject in the visible light image. The area set unit sets the size of the movement area of the infrared light source in the infrared light image based on a size of the face of the subject in the visible light image.

The display control device further includes a specifying unit configured to specify one of the subjects based on positions of the faces of the subjects in the visible light image and the position of the infrared light source of the infrared light image when more than one faces are detected by the face detection unit. The area set unit sets the size of the movement area of the infrared light source in the infrared light image based on the size of the face of the subject specified by the specifying unit.

The display control device further includes a distance calculation unit configured to calculate a distance from the subject based on the visible light image. The area set unit sets the size of the movement area of the infrared light source in the infrared light image based on the distance from the subject.

In the display control device, the area set unit sets the size of the movement area of the infrared light source in the infrared light image based on the distance from the subject and a size of the display unit.

The display control device further includes an imaging control unit configured to switch parameters related to imaging by the imaging unit so as to be most suitable to the visible light image and the infrared light image respectively, which are output by the imaging unit.

The display control device further includes an imaging control unit configured to set a parameter related to imaging by the imaging unit so as to be most suitable to the visible light image output by the imaging unit.

The display control device further includes a difference image generation unit configured to generate a difference image based on infrared light images in different time frames. The area set unit sets the movement area of the infrared light source which makes movement in the difference image.

The display control device further includes a distance calculation unit configured to calculate a distance from the subject based on the visible light image. The display control unit displays a target to be displayed on the display unit in a size corresponding to the distance from the subject and moves a cursor on the display unit according to movement of the infrared light source in the movement area.

The pixel signal output as the infrared light image from the imaging unit may be output from an imaging element in which a filter that transmits the infrared light is placed at one unit of 2×2 (=4) units when four pixels of RGB pixels are assumed as one pixel unit.

The pixel signal output as the infrared light image from the imaging unit is output from the imaging element in which the filter that transmits the infrared light is placed at one of G pixels in a Bayer array.

The pixel signal output as the infrared light image from the imaging unit is output from an imaging element in which a filter that transmits the infrared light is placed at one unit in 2×2 (=4) units when four pixels of white pixels are assumed as one unit.

A wavelength of the infrared light of the infrared light source is different from a wavelength of the infrared light emitted from an LED (Light Emitting Diode) of a remote controller for operating the electronic device, and the imaging unit has a filter having a transmission band of the wavelength of the infrared light of the infrared light source.

A display control method of an aspect of the present technique is a display control method of a display control device including an imaging unit for outputting a visible light image based on a pixel signal corresponding to a visible light among light input though a lens and an infrared light image based on a pixel signal corresponding to an infrared light among light input though the lens, includes an area setting step setting a movement area of an infrared light source in the infrared light image based on the visible light image; and a display controlling step controlling a cursor movement amount on a display unit according to movement of the infrared light source in the movement area.

A program of an aspect of the present technique is a program that makes a computer execute a display control process of a display control device including an imaging unit for outputting a visible light image based on a pixel signal corresponding to a visible light among light input through a lens and an infrared light image based on a pixel signal corresponding to an infrared light among light input through the lens, the process includes: an area setting step setting a movement area of an infrared light source in the infrared light image based on the visible light image; and a display controlling step controlling a cursor movement amount on a display unit according to movement of the infrared light source in the movement area.

According to an aspect of the present technique, a visible light image based on a pixel signal corresponding to a visible light among light input through a lens and an infrared light image based on a pixel signal corresponding to an infrared light among light input through the lens are output, a movement area of an infrared light source in the infrared light image is set based on the visible light image, and a cursor movement amount on a display unit is controlled according to a movement of the infrared light source in the movement area.

Effects of the Invention

According to an aspect of the present technique, user's operability can be improved in a free-cursor type user interface.

MODE FOR CARRYING OUT THE INVENTION

Hereinafter, embodiments of the present technique will be explained with reference to the drawings. The explanation will be made in the following order.

1. First embodiment (a configuration providing a free-cursor type user interface)

2. Second embodiment (an example specifying an operator from plural users)

3. Third embodiment (an example of an application to a camera system which performs video communication)

4. Fourth embodiment (an example of obtaining an ROI size according to a distance from an operator)

5. Fifth embodiment (an example of controlling a view of a display according to a distance from an operator)

1. First Embodiment

[Outer Configuration of Display Control Device]

Figure 1:
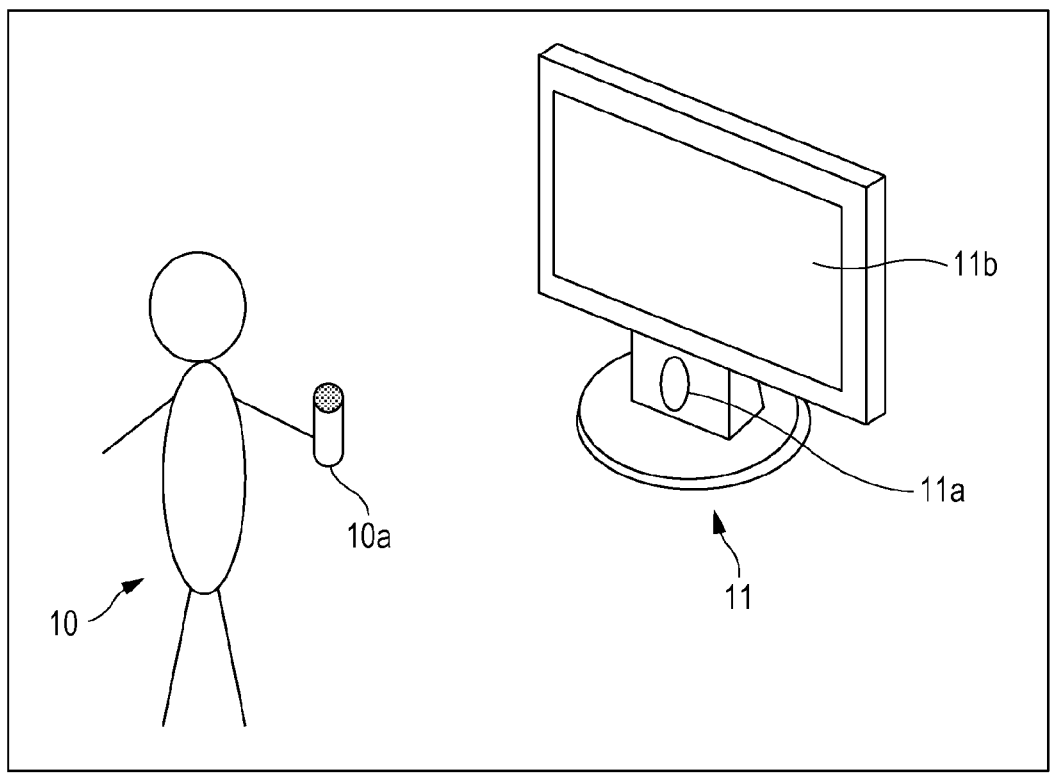
FIG. 1 is a diagram illustrating an outer configuration of a first embodiment of a display control device to which the present technique is applied.

FIG. 1 illustrates an outer configuration of a first embodiment of a display control device to which the present technique is applied.

In a display control device 11 of FIG. 1, a camera unit 11a takes an image of a user 10 and a spot of an infrared light (hereinafter, referred to as a bright spot) of a remote controller 10a that the user 10 operates, and a display 11b displays an operation screen for the user 10 and a cursor that moves according to movement of the bright spot taken by the camera unit 11a. In other words, the display control device 11 provides a free-cursor type user interface to the user 10.

[Example of Hardware Configuration of Display Control Device]

Figure 2:
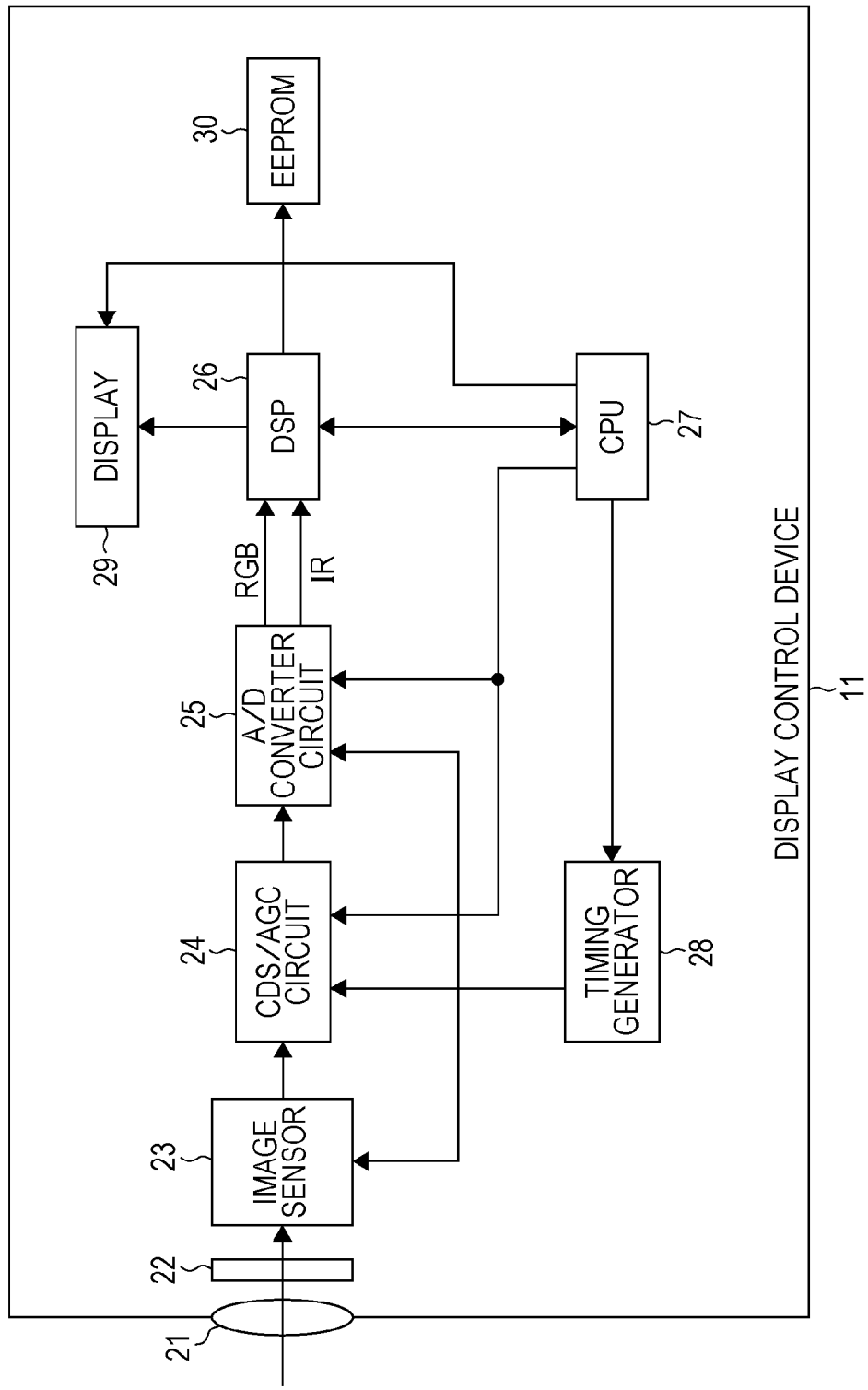
FIG. 2 is a block diagram illustrating a hardware configuration example of the display control device.

FIG. 2 is a block diagram illustrating a hardware configuration example of the display control device 11 that provides a free-cursor type interface.

The display control device 11 of FIG. 2 is composed of a lens 21, a special filter 22, an image sensor 23, a CDS (Correlated Double Sampling)/AGC (Automatic Gain Control) circuit 24, an A/D (Analog/Digital) converter circuit 25, a DSP (Digital Signal Processor) 26, a CPU (Central Processing Unit) 27, a timing generator 28, a display 29, and an EEPROM (Electrically Erasable Programmable Read Only Memory) 30.

The lens 21 is composed of a monocular single focus lens, collects light from a subject, and reflects the collected light to the image sensor 23 via the special filter 22. The image sensor 23 is composed of, for example, a CCD (Charge Coupled Device), a CMOS (Complementary Metal Oxide Semiconductor) sensor or the like, receives the light reflected from the lens 21 via the special filter 22, photoelectrically converts the light into an image signal image signal (analog signal) as an electrical signal corresponding to the amount of received light, and supplies to the CDS/AGC circuit 24.

A detailed configurations of the special filter 22 and the image sensor 23 will be explained with reference to FIGS. 3 to 5.

Figure 3:
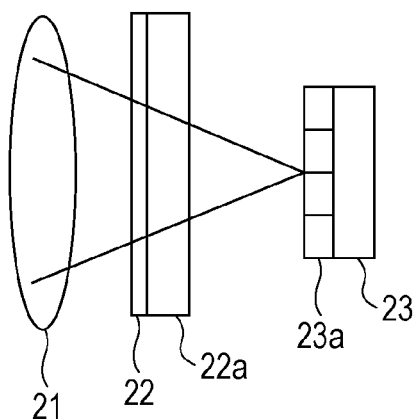
FIG. 3 is a diagram explaining a detail configuration of an imaging unit.

As illustrated in FIG. 3, the special filter 22 is formed and attached, as a film, to the sealing glass 22a that protects the image sensor 23. The special filter 22 has spectral characteristics with a transmission band of a visual light range (400 nm to 650 nm) as illustrated in a second top diagram in FIG. 4 and a wavelength range (940 nm) of an infrared light produced from an LED (Light Emitting Diode) of the remote controller 10a as illustrated in a top diagram in FIG. 4. Here, the special filter 22 may be formed as a film on either input face side or output face side of the sealing glass 22a.

The special filter 22 is composed of an interference filter of a multi-layer film in which about 40 to 50 thin-film materials are layered. As the thin-film materials, for example, dielectric materials such as $TiO_2$, $Ta_2O_2$, $SiO_2$, $MgF_2$ or the like are used. Further, the special filter 22 is formed as a filter by a manufacturing process such as an evaporation method, an IAD (Ion beam Assisted Deposition) method, a sputtering method, a CVD (Chemical Vapor Deposition) method or the like.

As illustrated in FIG. 3, the special filter 22 may be placed at any location on an optical axis in a lens tube in addition to the manner of being attached to the sealing glass 22a.

As illustrated in FIG. 3, a color filter array 23a is placed at a front face (in the left side in the figure) of the image sensor 23. The color filter array 23a is composed of color filters allocated to each pixel of the image sensor 23.

Figure 5:
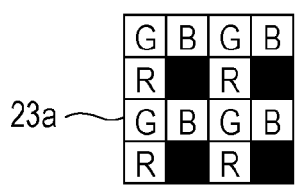
FIG. 5 is a diagram illustrating an example of an array of a color filter of an image sensor.

As illustrated in FIG. 5, an array of color filters in the color filter array 23a will be explained.

FIG. 5 illustrates an example of a color filter array, in a Bayer array, in which half of G pixels (one of G pixels in adjacent 2×2 (=4) pixels composed of R, G, B, G) are IR (InfraRed) transmission filters, which are illustrated in black in the diagram.

Figure 4:
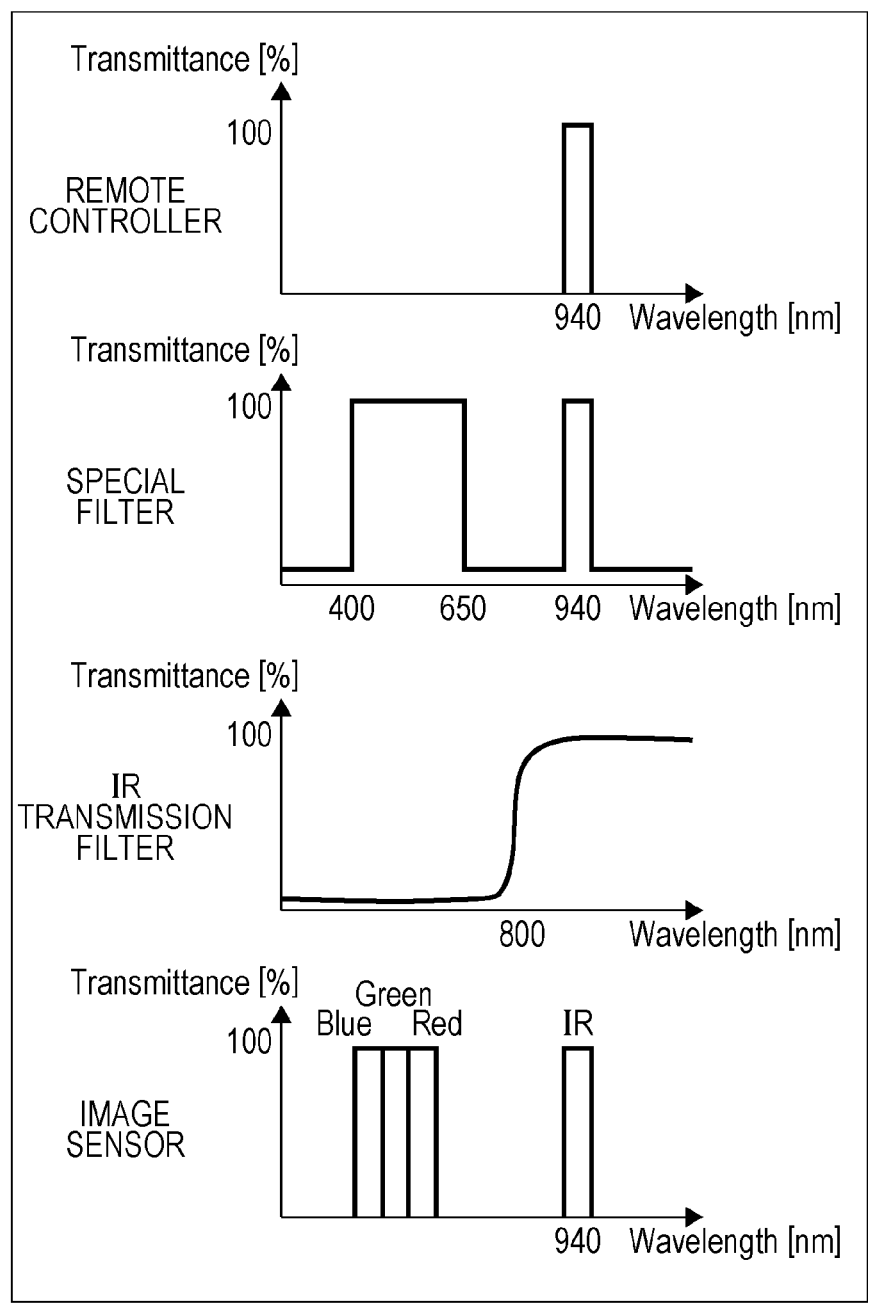
FIG. 4 is a diagram explaining an optical characteristic of the imaging unit.

The IR transmission filter has an optical characteristic illustrated in a third top diagram of FIG. 4 and is made to have a thickness of about 1 μm so as to keep the transmittance of a visual light range in a small percentage, by blending a pigment or a dye of an organic material used for a general color filter. In the optical characteristic of the IR transmission filter, a wavelength of a rising of the transmittance is set to be a shorter wavelength than a wavelength of the infrared light (940 nm) of the remote controller and, in the example of FIG. 4, it is set around 800 nm.

With the above configuration, as illustrated in a forth top diagram of FIG. 4, the image sensor 23 has a sensitivity to the visual light range and the wavelength range of the infrared light.

Figure 6:
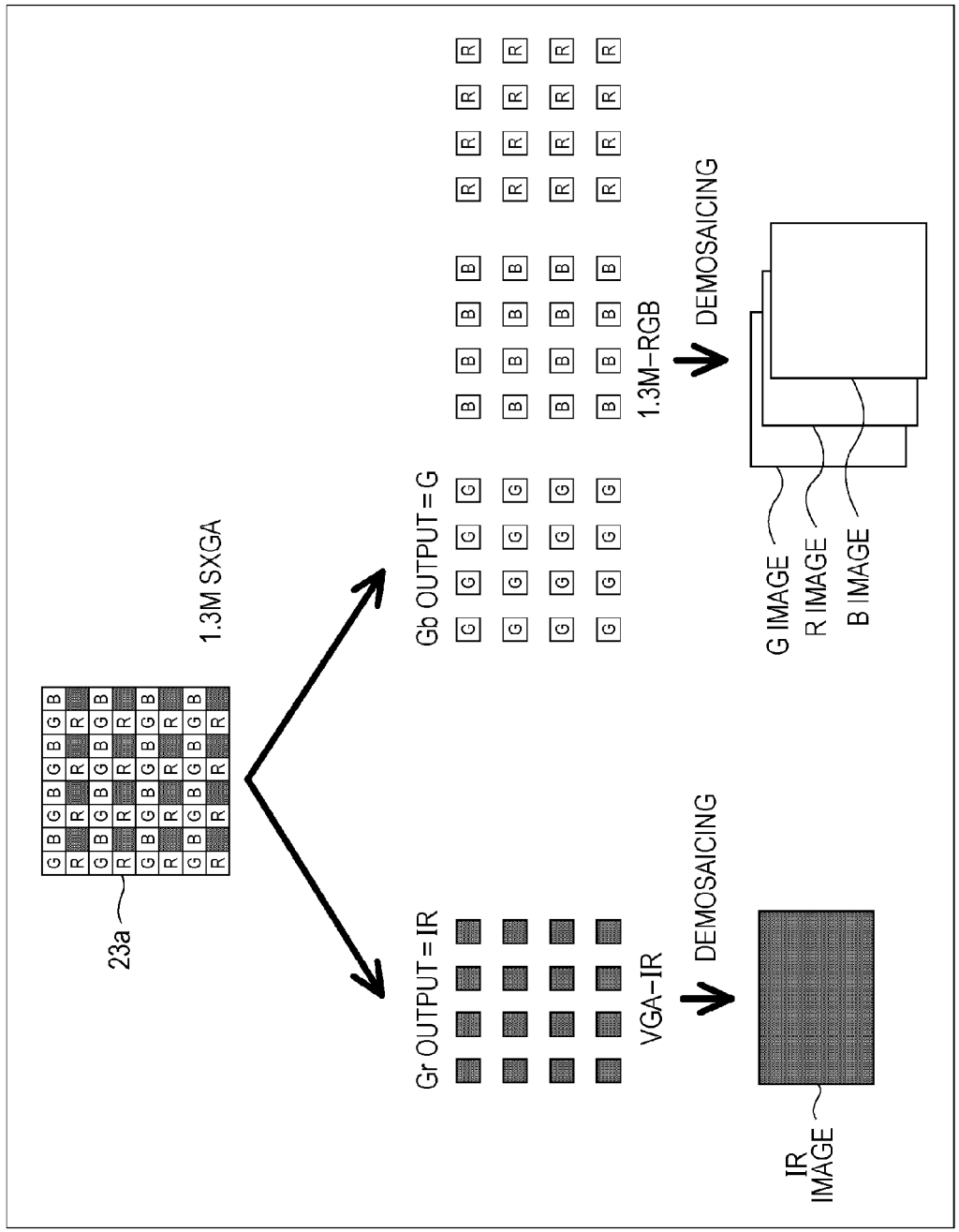
FIG. 6 is a diagram explaining output example of an RGB pixel and an IR pixel.

In other words, as illustrated in FIG. 6, by using the image sensor 23, a visible light image (RGB image) composed of an R image, a G image, and a B image, which are obtained by demosaicing an output with some cut of R, Gb (or Gr), B pixels (RGB pixels), and an infrared light image (IR image) obtained by demosaicing an output with some cut of Gr (or Gb) pixels (IR pixels) can be obtained. In the example of FIG. 6, a resolution of the image sensor 23 is made to be an SXGA (Super Extended Graphics Array) (1280×1024: 1.3 M). A resolution of RAW images of the RGB image and IR image are both VGA. Here, regarding the RGB image, an RGB image in SXGA resolution can be obtained by performing an image process which is the same as a process for a color image corresponding to a pixel of a general Bayer array, after an interpolation process to make Gr=Gb, for example. The resolution of the IR image is VGA.

Referring back to FIG. 2, the CDS/AGS circuit 24 cancels 1/f noise generated in the image sensor 23 and outputs to the A/D converter circuit 25 as adjusting gain so that the size (level) of the image signals provided from the image sensor 23 becomes constant, based on a control of the CPU 27. Further, the CDS/AGS circuit 24 performs an electronic shuttering process for electrically changes an electrical charge accumulation time in the image sensor 23, based on a control of the CPU 27.

The A/D converter circuit 25 converts an image signal as an analog signal output from the CDS/AGS circuit 24 into image data as a digital signal and provide it to the DSP 26. As the image data obtained by the A/D converter circuit 25, there are image data of an RGB image and image data of an IR image as described above.

The DSP 26 performs a predetermined image process on the image data (image data of RGB image and IR image) from the A/D converter circuit 25 and provides the result to the display 29 or the EEPROM 30.

The CPU 27 controls each unit of the display control device 11.

The timing generator 28 generates various timing signals based on the control of the CPU 27 and provides them to the image sensor 23, the CDS/AGC circuit 24, and the A/D converter circuit 25.

The display 29 corresponds to the display 11b of FIG. 1, and displays a predetermined image or a display according to the result of the image process result from the DSP 26, based on the control of the CPU 27. For example, on the display 29, an operation screen on which the user 10 performs an operation input to the display control device 11. Here, the display 29 may be provided separately from the display control device 11.

The EEPROM 30 is a so-called non-volatile memory that stores and maintains various configuration parameters, the image process result from the DSP 26, or the like without losing the stored and maintained information even when the power is turned off.

[Example of Functional Configuration of Display Control Device]

Next, referring to FIG. 7, an example of a functional configuration of the display control device 11 will be explained.

Figure 7:
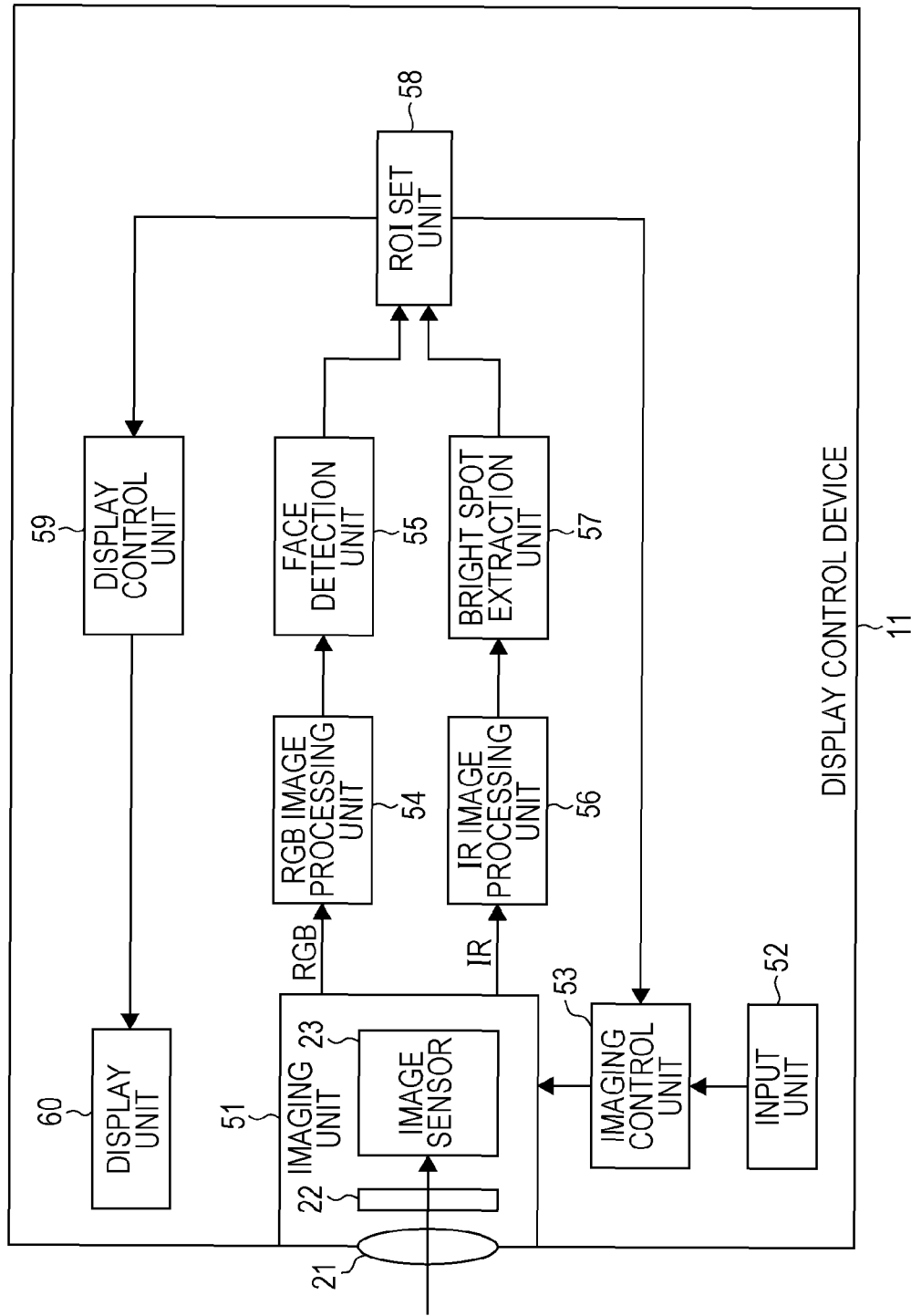
FIG. 7 is a block diagram illustrating a functional configuration example of the display control device.

The display control device 11 of FIG. 7 is composed of an imaging unit 51, an input unit 52, an imaging control unit 53, an RGB image processing unit 54, a face detection unit 55, an IR image processing unit 56, a bright spot extraction unit 57, an ROI (Region Of Interest) set unit 58, a display control unit 59, and a display unit 60.

The imaging unit 51 includes the lens 21, the special filter 22, and the image sensor 23, which are explained in FIG. 2, and also includes the CDS/AGC circuit 24 and the A/D converter circuit 25, which are not illustrated. In other words, the imaging unit 51 corresponds to the camera unit 11a of FIG. 1, takes an image of a subject (the user 10 and the infrared light of the remote controller 10a), and outputs corresponding image data to the RGB image processing unit 54 and the IR image processing unit 56. Further, the imaging unit 51 performs a gain adjustment and an electronic shuttering process based on the control of the imaging control unit 53.

The input unit 52 receives the infrared light from the remote controller 10a corresponding to the operation input of the user 10 and provides an signal (operation signal) indicating the user's operation input to the imaging control unit 53.

The imaging control unit 53 sets various parameters related to imaging according to the operation signal from the input unit 52 and an instruction from the ROI set unit 58, and controls imaging of the imaging unit 51.

The RGB image processing unit 54 performs a predetermined image process on the image data of the RGB image among image data from the imaging unit 51 (hereinafter, simply referred to as an RGB image), and provides it to the face detection unit 55.

The face detection unit 55 detects a face of the user 10 in the RGB image from the RGB image processing unit 54 and provides the size of the detected face (face image) to the ROI set unit 58.

The IR image processing unit 56 performs a predetermined image process to the image data of the IR image among the image data from the imaging unit 51 (hereinafter, simply referred to as an IR image), and provides it to the bright spot extraction unit 57.

The bright spot extraction unit 57 extracts (detects) a bright spot (point) of the infrared light of the remote controller 10a held by the user 10 in the IR image from the IR image processing unit 56 and supplies the IR image in which the bright spot is detected to the ROI set unit 58.

The ROI set unit 58 obtains a size of the ROI (Region Of Interest) which is the range (area), in which the user 10 may move the remote controller 10a before a next frame, based on the face size of the user 10 in the RGB image from the face detection unit 55. Further, the ROI set unit 58 sets a position of the ROI whose size has been obtained so as to place the bright spot in the center thereof in the IR image, in which the bright spot is detected, from the bright spot extraction unit 57. Then, when the bright spot moves, the ROI set unit 58 provides a movement amount of the bright spot in the IR image to the display control unit 59.

The display control unit 59 controls the display of the display unit 60, which corresponds to the display 11*b* of FIG. 1 (or the display 29 of FIG. 2). Concretely, the display control unit 59 controls the display unit 60 to display an operation screen as a user interface for the user 10 who handles the remote controller 10*a* and moves a cursor, which is used by the user 10 to select a predetermined item on the operation screen, on the operation screen according to the movement amount of the bright spot from the ROI set unit 58.

[Regarding Cursor Display Control Process]

Next, with reference to a flowchart of FIG. 8, a cursor display control process of the display control device 11 will be explained.

For example, when display control device 11 is turned on and a monitoring mode for monitoring a viewing condition of the viewer is selected by the operation on the remote controller 10*a* by the user 10, the display control device 11 is switched to the monitoring mode which enables to take an image of the subject. In the present embodiment, the display control device 11 is in the monitoring mode in a neutral condition. In other words, the display control device 11 functions as a human sensor that performs, in a neutral condition, an action to conserve energy by observing the viewing condition of the viewer.

In step S11, the imaging control unit 53 sets a resolution, a shutter speed, and gain to values suitable for the RGB image as a parameter related to imaging of the imaging unit 51 based on the operation signal from the input unit 52 in response to the infrared light of the remote controller 10*a*.

In the present embodiment, as described above, a detection of the face of the user 10 in RGB image is performed. Here, the resolution of the RGB image may be satisfied with a resolution level which enables a face detection. In general, it is said that a face detection can be processed with black and white information in a resolution equal to or greater than 16×16 pixels, and there is a commercially available digital camera having a face detection function that focuses on the process speed by downgrading the resolution and color information.

Figure 9:
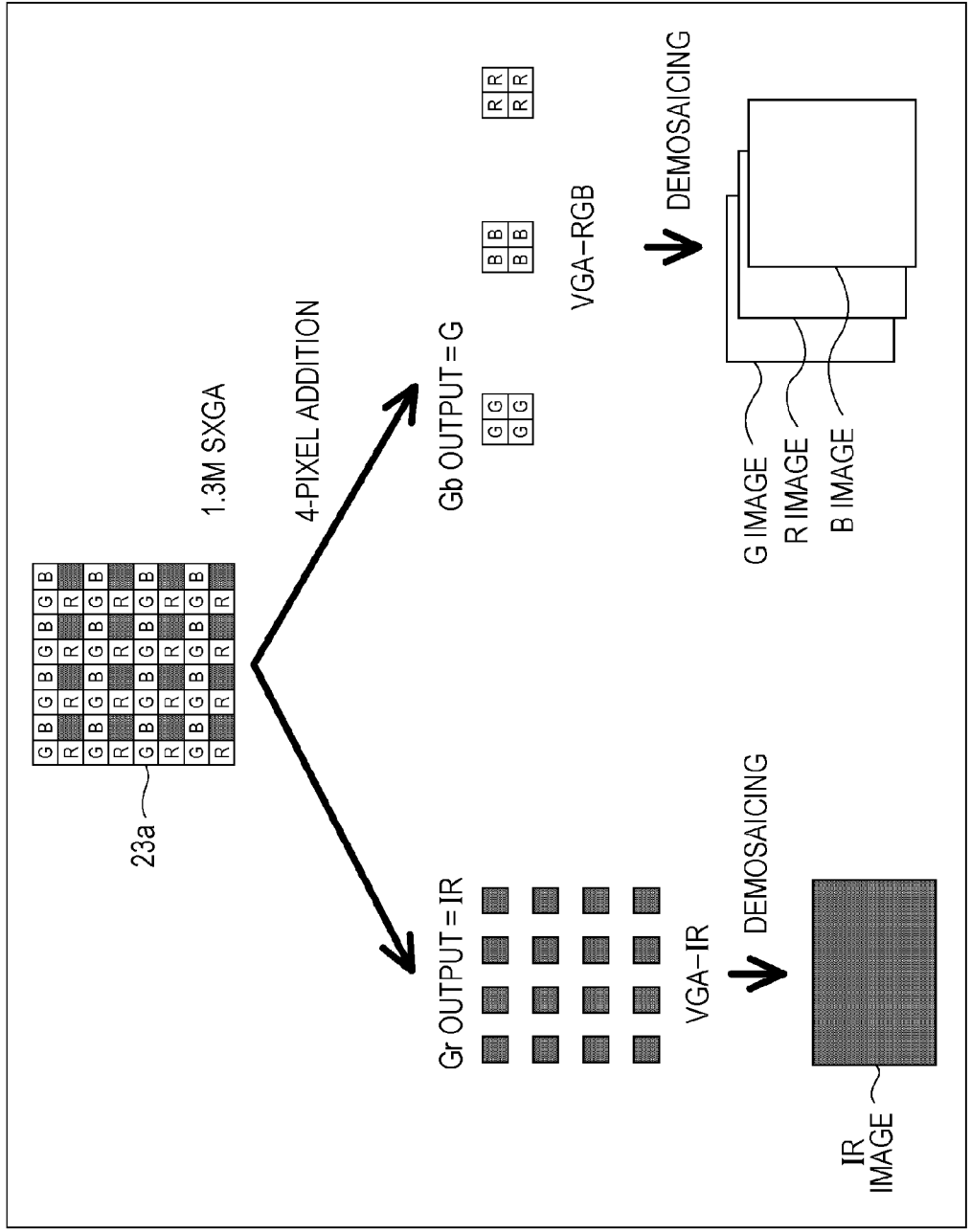
FIG. 9 is a diagram explaining output examples of the RGB pixel and the IR pixel.

As illustrated in FIG. 9, the resolution is set so that an RGB image in a VGA (Video Graphics Array) (640×480) size can be obtained by performing a 4-pixel addition on the RGB pixel. For the 4-pixel addition, for example, a method disclosed in Japanese Patent Application Laid-Open No. 4518616 may be employed or another method may be employed. By performing a 4-pixel addition, the sensitivity of the RGB image quadruples so that a robust face detection can be performed even when the user 10 and the display control device 11 are in a dark lighting environment. Here, in a case of a color filter array illustrated in FIG. 9, since an output of the Gr pixel is an output of an IR pixel, a demosaic process is performed by considering the output of the Gb pixel as a Green pixel. Alternatively, a 4-pixel addition in a typical Bayer array may be performed by assigning a Gb pixel output in the same Bayer domain as an output of the Gr pixel, and using a generated quasi Gr pixel output.

Figure 10:
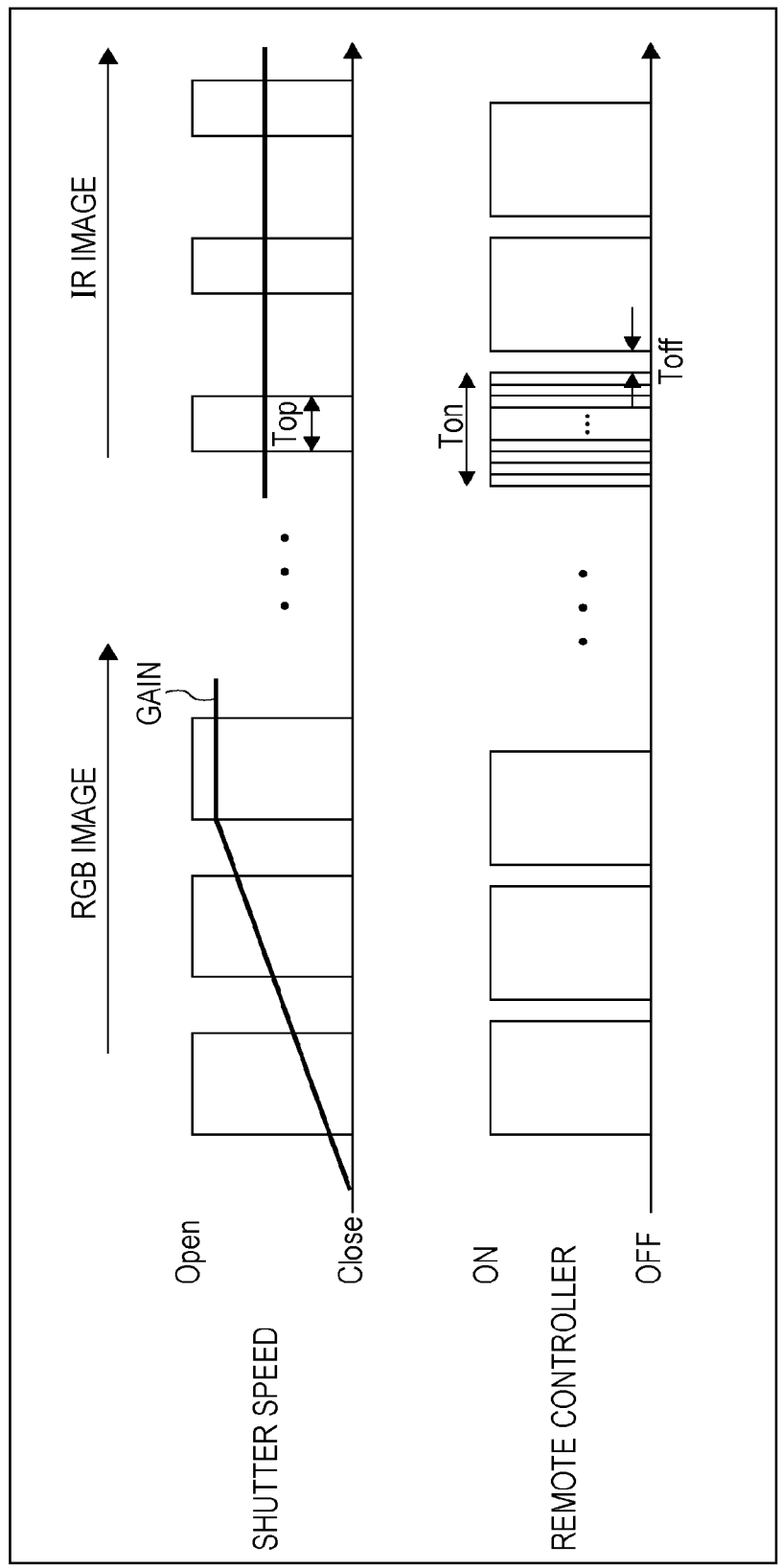
FIG. 10 is a diagram explaining a shutter speed and gain.

Further, here, an AE (Auto Exposure) process same as those in a typical digital camera is performed and, as illustrated in the upper left diagram of FIG. 10, the shutter speed and gain are set as a most preferable value.

The RGB image and the IR image are taken with the parameter which is set as described above and provided respectively to the RGB image processing unit 54 and the IR image processing unit 56. Here, it can be made so that the IR image processing unit 56 does not perform any process on the IR image.

Figure 8:
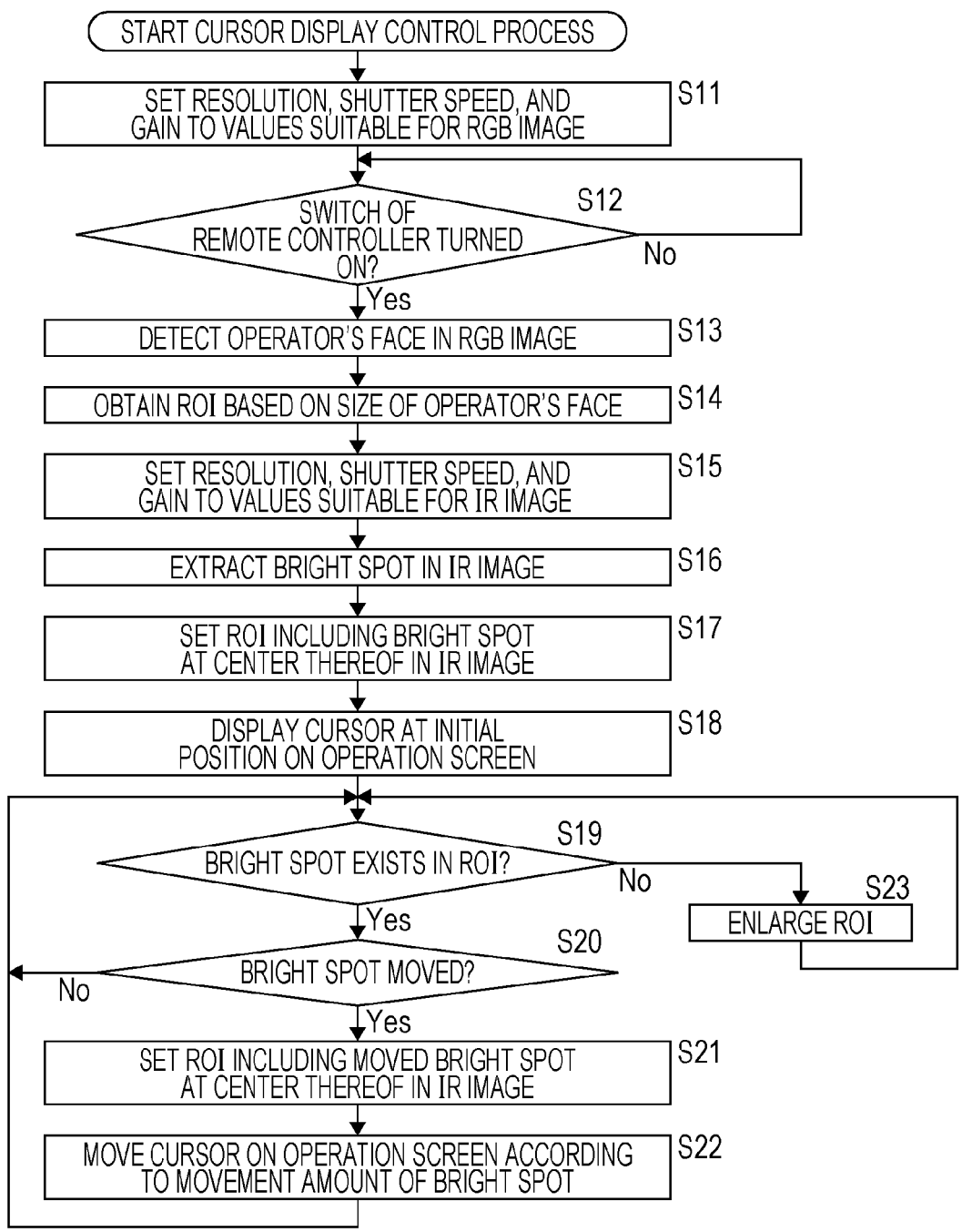
FIG. 8 is a flowchart explaining a cursor display control process of the display control device of FIG. 7.

Referring back to the flowchart of FIG. 8, in step S12, the input unit 52 determines whether a free-cursor mode switch (button), which is placed on a chassis of the remote controller 10*a*, is tuned on by the user 10. Here, the free-cursor mode switch is a mode in which an operation screen is displayed on the display unit 60 of the display control device 11 to let the user 10 as an operator operate a cursor on the operation screen.

In step S12, when it is determined that the free-cursor mode switch is not turned on, a process in step S12 is repeated until the free-cursor mode switch is turned on. Here, the display control device 11 is in a monitoring mode in a neutral condition and functions as a human sensor.

Then, in step S12, when it is determined that the free-cursor mode switch is turned on, the process proceeds to step S13. In addition, when the free-cursor mode switch on the remote controller 10*a* is turned on, the LED of the remote controller 10*a* starts a continuous emission. Further, on the display unit 60 of the display control device 11, a predetermined operation screen is displayed based on the control of the display control unit 59.

In step S13, the face detection unit 55 detects the face of the user 10 in the RGB image from the RGB image processing unit 54 and provides the size of the detected face in the RGB image to the ROI set unit 58.

In step S14, the ROI set unit 58 obtains a size of the ROI which is a range (area) the user 10 may move the remote controller 10*a*, based on the size of the face of the user 10 as the operator from the face detection unit 55.

Figure 11:
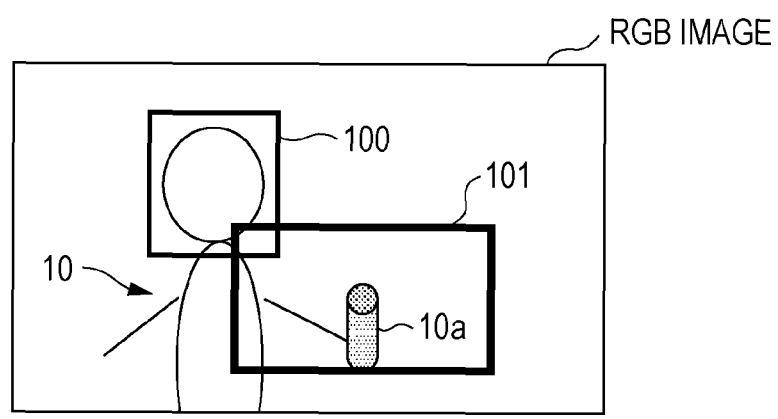
FIG. 11 is a diagram explaining setting of a face detection and an ROI size.

For example, as illustrated in FIG. 11, when the face of the user 10 is detected in the RGB image, a detection frame 100 is set to the detected face. Here, under the consideration of the range in which an arm of the user 10 moves (stroke quantity), the ROI 101 is defined as a rectangular area being double of the width of the face (detection frame 100) in a horizontal direction and the same as the height of the face (detection frame 100) in the vertical direction. In addition, the shape of the ROI 101 is not limited to the rectangular as illustrated in FIG. 11 and may be an oval inscribed in the rectangular, a precise circle, a square, or the like.

After obtaining the size of the ROI, the ROI set unit 58 provides information that the size of the ROI has been obtained to the imaging control unit 53.

In step S15, the imaging control unit 53 sets the resolution, the shutter speed, and the gain to the values suitable to the IR image as a parameter related to imaging by the imaging unit 51 according to the information from the ROI set unit 58.

In this embodiment, as described above, the bright spot of the remote controller 10*a* held by the user 10 is extracted in the IR image. An extraction (detection) ability of the bright spot in the IR image is determined according to the number of pixels included in the ROI set in the IR image. Further, the cursor moves on the operation screen according to the movement amount of the bright spot in the ROI in the IR image. Here, when the number of the pixels included in the ROI is small, the movement of the cursor on the operation screen becomes rough. Thus, it is preferable that the resolution of the IR image is a high resolution.

As illustrated in FIG. 9, the resolution is set so that a VGA-size IR image in which an IR pixel is placed in every another pixel is obtained from an SXGA (1.3 M pixel) image of the image sensor 23.

Next, the shutter speed and the gain set related to the IR image will be explained with reference to FIG. 10.

In general, regarding an infrared light remote controller emitting an infrared light, a bit value is defined according to a pattern of light-on and light-off (blinking) of a PPM (Pulse Position Modulation) signal. Concretely, the bit value is defined by changing lengths of ON-Time Ton and OFF-Time Toff illustrated in the lower diagram of FIG. 10. During ON-Time Ton, the LED of the infrared light remote controller performs a pulse emission with 38 kHz carrier frequency. Further, a minimum length of OFF-Time Toff (reset time in a signal frame) is made to be around 6 msec. In this embodiment, it is made that the LED of the infrared light remote controller emits in a fixed pattern in which the signal frame length is fixed and OFF-Time Toff is set at minimum.

In the meantime, the shutter speed of the imaging unit 51 of the display control device 11 and the emission pattern of the LED of the remote controller 10a are not synchronized. Thus, when a shutter open time Top of the imaging unit 51 and the OFF-Time Toff of the LED emission of the remote controller 10a happen coincidentally, the bright spot cannot be extracted in the IR image in the frame.

In order to solve this, according to this embodiment, the shutter open time Top of the imaging unit 51 is made to be longer than the OFF-Time Toff of the LED emission of the remote controller 10a. Further, since an extraction of the bright spot in the IR image becomes difficult when only equal to or less than the energy taken during the ON-Time Ton of the LED emission of the remote controller 10a is taken during the shutter open time Top of the imaging unit 51, shutter open time Top of the imaging unit 51 is preferable to be equal to or more than twice as the OFF-Time Toff of the LED emission.

Further, according to the optical characteristic of the IR transmission filter corresponding to the IR pixel, illustrated in the third top diagram in FIG. 4, the IR transmission filter cannot completely block out the light in the visual light range in actual so that a small percent of the visible light goes through in the IR pixel and it becomes a noise (hereinafter, referred to as a background noise) in IR image. For example, in a living room to which a bright outside light enters or in a room in which a white fluorescent lamp is used as lighting, the background noise notably appears. Since the infrared light from the LED of the remote controller 10a is directly reflected to the IR pixel in the image sensor 23, the reflected light amount in a time period is sufficiently greater than the visible light amount that causes a background noise. Therefore, the shutter open time Top of the imaging unit 51 is not required to be made longer than necessary and set to be properly in a short length. This minimizes an influence of a background noise.

In this embodiment, regarding imaging of an IR image, the shutter open time Top of the imaging unit 51 is set to be equal to or more than twice the OFF-Time Toff of the LED emission and to be shortest as possible. This prevents an error of a bright spot extraction in a predetermined frame of the IR image and an SNR (Signal to Noise Ratio) of the bright spot extraction in the IR image can be improved by suppressing the influence of the background noise.

Concretely, as gradually changing the shutter open time Top of the imaging unit 51 longer, within a few frames of the IR image, from a default of 2×Toff for example, a shutter speed with which a maximum output value of the IR pixel does not saturate is set and gain is set indifferent. Or, it may be made to set a fixed shutter speed in which the shutter open time Top of the imaging unit 51 is a predetermined time equal to or more than 2×Toff.

In this manner, the resolution, the shutter speed, and the gain of imaging by the imaging unit 51 can be switched to values suitable for the IR image from the values suitable for the RGB image. Here, in the following process, the RGB image processing unit 54 may be made not to perform any process on the RGB image.

Figure 12:
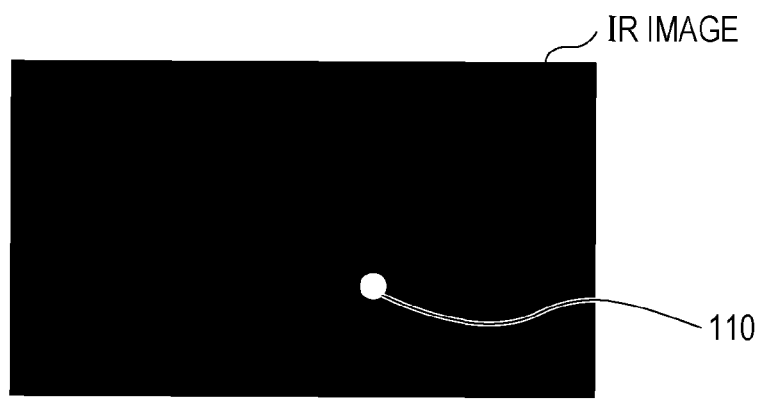
FIG. 12 is a diagram explaining a bright spot extraction in the IR image.

Referring back to the flowchart of FIG. 8, in step S16, the bright spot extraction unit 57 extracts a bright spot 110 of the remote controller 10a in the IR image from the IR image processing unit 56, which is illustrated in FIG. 12 for example, and provides the IR image in which the bright spot is extracted to the ROI set unit 58.

Figure 13:
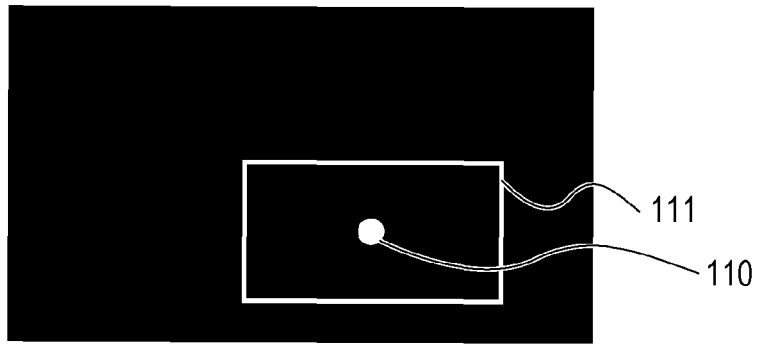
FIG. 13 is a diagram explaining an ROI setting in the IR image.

In step S17, as illustrated in FIG. 13, in the IR image from the bright spot extraction unit 57, in which the bright spot 110 is extracted, the ROI set unit 58 sets the ROI 101, whose size is obtained so as to center the bright spot 110 in step S14, as a ROI 111. The ROI set unit 58 provides information that the ROI 111 has been set in the IR image to the display control unit 59.

In step S18, when the information from the ROI set unit 58 is provided, the display control unit 59 displays the cursor at an initial position on the operation screen displayed on the display unit 60. Here, the initial position on the operation screen may be the center of the operation screen or a position corresponding to an arrangement of menu icons on the operation screen.

After that, for the IR image of each frame, a bright spot extraction in the ROI in current frame is performed by the bright spot extraction unit 57 and IR images in which the bright spot is extracted is provided to the ROI set unit 58.

In step S19, the ROI set unit 58 sets the ROI set in the IR image of a previous frame (hereinafter, also referred to as a previous frame IR image) to the IR image from the bright spot extraction unit 57 (hereinafter, also referred to as a current frame IR image), and determines whether the bright spot exists in the ROI.

In step S19, when it is determined that there is a bright spot in the ROI, the process proceeds to step S20 and the ROI set unit 58 determines whether the bright spot in the current frame IR image has moved based on the position of the bright spot in the previous frame IR image.

In step S20, when it is determined that the bright spot has not moved, the process proceeds back to step S19 and a process for an IR image in a next frame (next frame IR image) is performed. In this case, in the next frame IR image, the ROI is set at the same position as the ROI set in the current frame IR image.

On the other hand, when it is determined that the bright spot has moved in step S20, the process proceeds to step S21. In this case, the ROI set unit 58 obtains a movement amount of the bright spot in the IR image (ROI) and provides it to the display control unit 59.

In step S21, the ROI set unit 58 sets an ROI of the next frame so as to center the (moved) bright spot in the current frame IR image.

In step S22, the display control unit 59 moves the cursor on the operation screen displayed on the display unit 60 according to the movement amount of the bright spot from the ROI set unit 58. After that, the process returns to step S19 and a process on the IR image in the next frame is performed.

In this manner, tracking of the bright spot is performed in the IR images.

Figure 14:
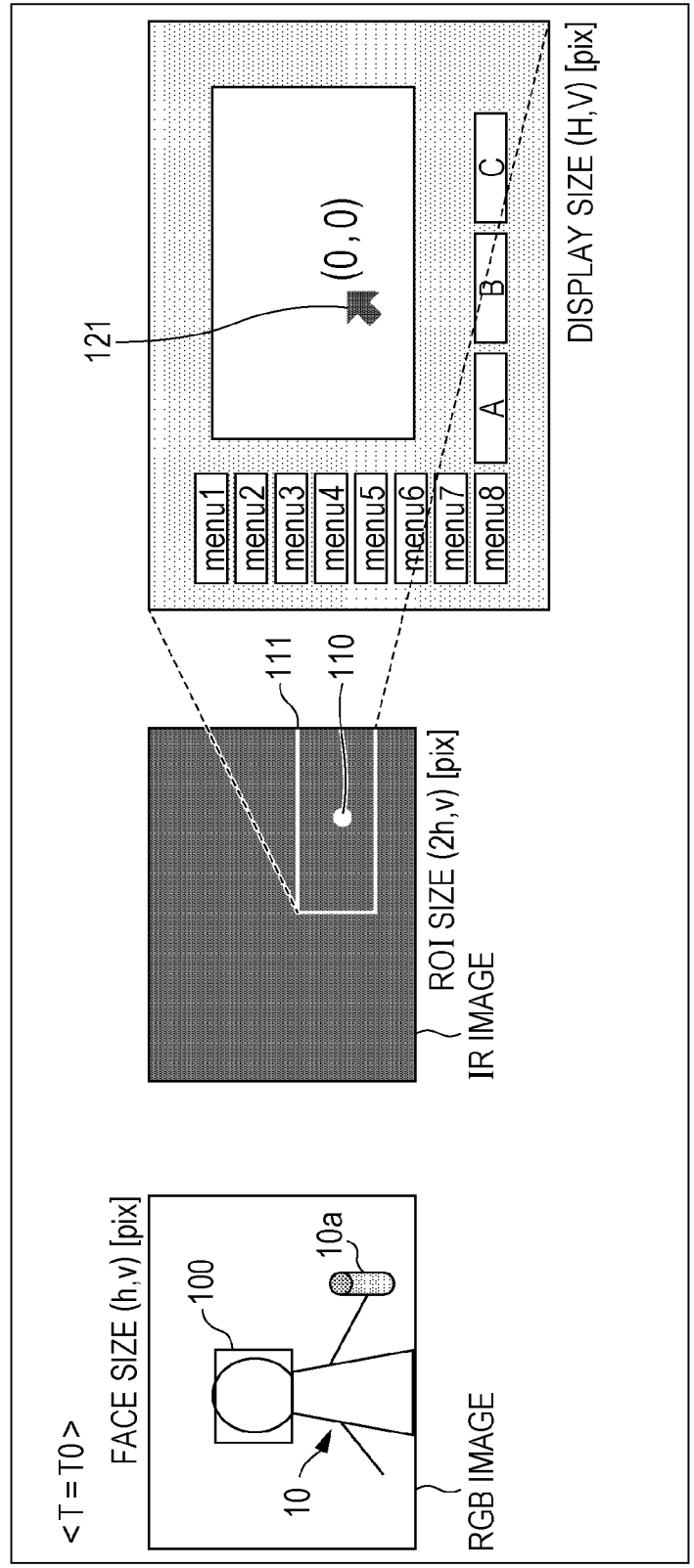
FIG. 14 is a diagram explaining a cursor movement on a display.
Figure 15:
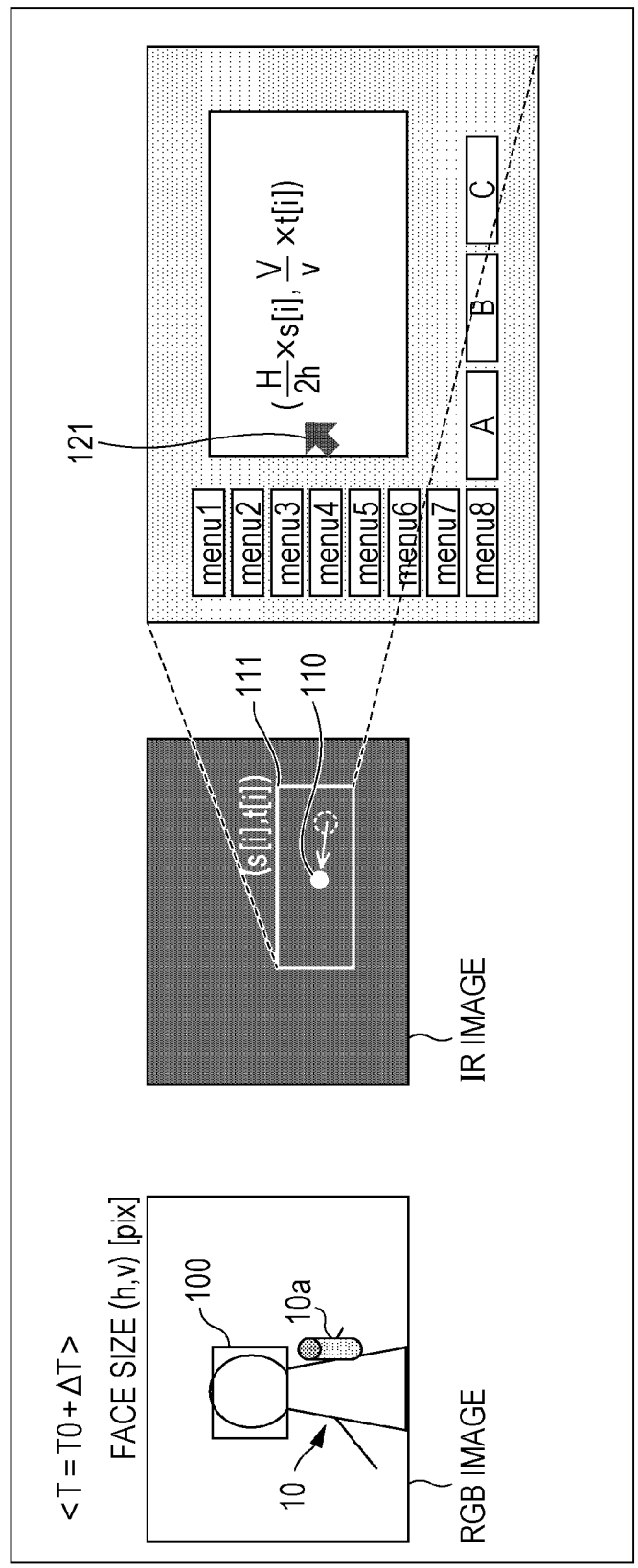
FIG. 15 is a diagram explaining the cursor movement on the display.
Figure 16:
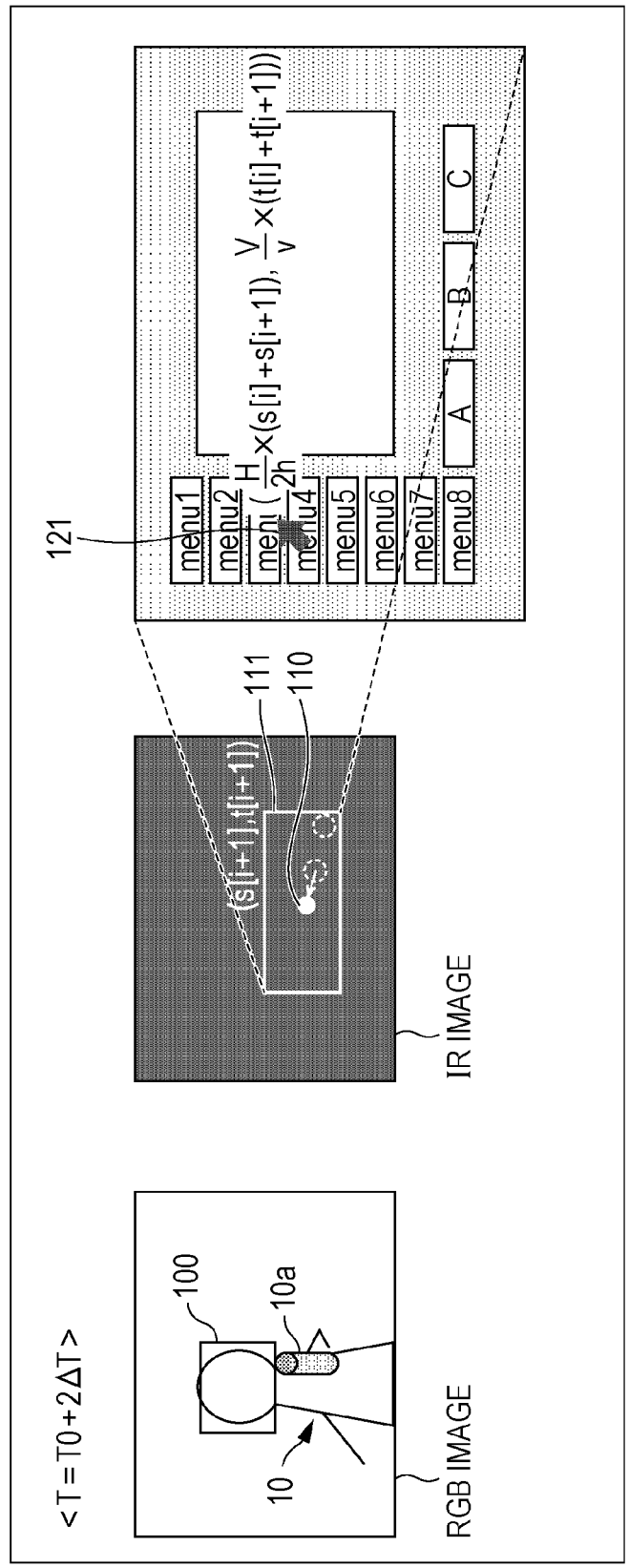
FIG. 16 is a diagram explaining the cursor movement on the display.

Referring to FIGS. 14 to 16, tracking of the bright spot in the IR images ad moving of the cursor on the operation screen will be explained in detail. FIG. 14 illustrates an initial condition (time T=T0), that is, an example of the RGB image, the IR image, and the operation screen when the cursor is displayed at the initial position on the operation screen in step S18. FIGS. 15 and 16 illustrate examples of the RGB image, the IR image, and the operation screen respectively at time ΔT and time 2ΔT after the initial condition. Here, in tracking of the bright spot in the IR images, a process on the RGB image is not performed; however, for the purpose of explaining, the RGB images are illustrated with the examples of the IR image and the operation screen.

In the examples of FIGS. 14 to 16, an aspect ratio of the RGB image and the IR image is 4:3, and an aspect ratio of the operation screen (display unit 60) is 16:9. On the operation screen, for example, menu icons menu 1 to menu 8 for selecting channels of television programs, and menu icons A to C for selecting devices to be connected to the display control device 11 such as a BD (Blu-Ray (registered trademark) Disc) player, a DVD (Digital Versatile Disc) player and a game machine are arranged in an L-shape. Further, on the operation screen, as being surrounded by the menu icons arranged in an L-shape, there is a display area in which pictures of a television broadcast programs or pictures from connected devices are displayed.

Further, when the face size (detection frame 100) detected in the RGB image is h pixels in a horizontal line and v pixels in a vertical line (hereinafter, referred to as (h, v)[pix] or the like), the size of the ROI 111 set in the IR image is (2h, v)[pix]. Further, the size of the operation screen (display unit 60) is (H, V)[pix]. Here, the horizontal to vertical ratio of the ROI in the IR image and the horizontal to vertical ratio of the operation screen may or may not be the same.

Firstly, as illustrated in FIG. 14, in time T=T0, when the face in the RGB image is detected and the ROI 111 is set based on the size of the detection frame 100 and the bright spot 110 in the IR image, the cursor 121 is displayed at a central coordinate (0, 0) as the initial position on the operation screen.

Next, as illustrated in FIG. 15, in time T=T0+ΔT, when the remote controller 10a is swung by the user 10 and the bright spot 110 moves in the IR image by a vector (s[i], t[i])[pix] from a condition in time T=T0, the ROI 111 is set, in the IR image, so that the bright spot 110 that has moved by the vector (s[i], t[i]) from the condition in time T=T0 becomes at a center thereof. After that, the cursor 121 on the operation screen is displayed at a coordinate indicated being displaced as follows from the central coordinate (0, 0) on the operation screen based on the size (2h, v) of the ROI 111 and the size (H, V) of operation screen.

[Equation 1]

$$\left(\frac{H}{2h} \times s[i], \frac{V}{v} \times t[i]\right)$$

Then, as illustrated in FIG. 16, in time T=T0+2ΔT, when the remote controller 10a is further swung by the user 10 and the bright spot 110 moves in the IR image by a vector (s[i+1], t[i+1])[pix] from a condition in time T=T0+ΔT, the ROI 111 is set, in the IR image, so that the bright spot 110 which has moved by a vector (s[i+1], t[i+1]) from the condition in time T=T0+ΔT is placed at the center thereof.

After that, the cursor 121 on the operation screen is displayed at a coordinate indicated being displaced as follows from the central coordinate (0, 0) on the operation screen based on the size (2h, v) of the ROI 111 and the size (H, V) of operation screen.

[Equation 2]

$$\left(\frac{H}{2h} \times (s[i]+s[i+1]), \frac{V}{v} \times (t[i]+t[i+1])\right)$$

Referring back to the flowchart in FIG. 8, in step S19, when it is determined that the bright spot does not exist in the ROI, the process proceeds to step S23 and the ROI set unit 58 enlarges the ROI. After that, the process returns to step S19. With this configuration, the process can proceed even when the bright spot in the current frame IR image exists outside the ROI set in previous frame IR image for some reason. Further, when the process in step S23 is repeated for plural times, five times for example, since there is a possibility that the operator has moved, the process may return to the monitoring mode as the neutral condition in step S11 to reset the position of the operator.

According to the above process, the ROI determined according to the size of the user's face in the RGB image is always set as centering the bright spot in the IR image and the cursor on the operation screen is made to move according to the movement amount of the bright spot in the ROI. In other words, the cursor can be moved overall on the operation screen at an arm stroke amount that the user does not feel stressed without directly obtaining the distance from the display control device to the user and regardless of the distance from the user. Therefore, regarding the free-cursor type user interface, user's operation can be improved without performing calibration repeatedly to obtain the distance between the camera and the operator or obtaining a distance between the camera and the operator.

Further, when the bright spot is extracted in the IR image, a process cost for extracting the bright spot in each frame can be reduced at a large degree since the bright spot is not extracted by searching the bright spot from the entire IR image but extracted from the ROI set in the IR image of a previous frame. In particular, since the position of the bright spot needs to be detected in real time, a frame rate equal to or greater than 15 fps which is relevant to a typical digital video camera is required, a user interface having a great time response can be provided even with a low cost CPU power by using an image sensor compatible with a high frame rate of a level in 30 fps to 60 fps.

Further, a parallax is not generated in obtained RGB image and IR image and a synchronism can be maintained because the function of the monitoring camera for monitoring the viewing condition of the viewer and the function of the infrared camera for imaging the an infrared light spot of the remote controller are realized by the single imaging unit 51, that is, a monocular camera system.

Further, since the process on the RGB image and the process on the IR image are serially performed, the resolution, the shutter speed, and the gain can be set to values which is respectively suitable to the RGB image and the IR image and a system that complementary uses information about the RGB image and information about the IR image can be made.

[Example of Outputs of RGB Pixel and IR Pixel]

It will be considered a case that the screen size of the display unit 60 (display 11b, 29) of the display control device 11 is not large, that is, concretely, a case of a screen size of equal to or smaller than a 32-inch size whose viewing distance is equal to or less than 3 m.

In this case, since not so many menu icons can be arranged on the operation screen, the resolution of the IR image may be lower than the resolution explained in FIG. 6.

Figure 17:
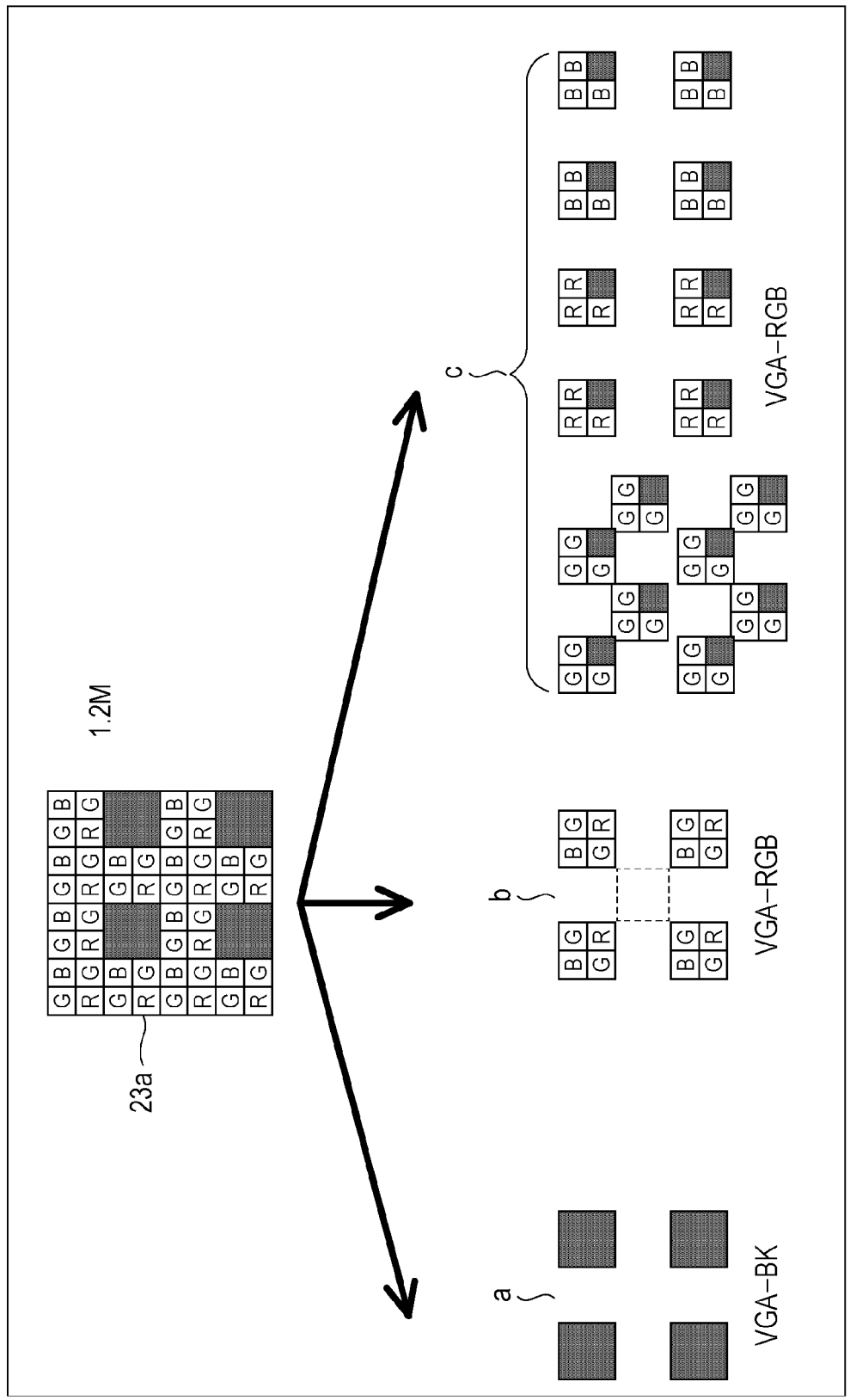
FIG. 17 is a diagram explaining output examples of the RGB pixel and the IR pixel.

In other words, in this case, the array of the color filter array 23a placed in front of the image sensor 23 may be an array as illustrated in FIG. 17. In the color filter array 23a of FIG. 17, when four pixels in Bayer array serves as one pixel unit, one pixel unit in four pixel units is composed of an IR transmission filter. In an IR pixel, the number of pixels is VGA, but a spatial resolution is lower than the array illustrated in FIG. 6 because it is placed in every two pixels. In the case of FIG. 17, in the image sensor 23, it is assumed that pixels of about 1.2 M (1240×960) in 1.3 M (SXGA) are used.

In the example of FIG. 17, the IR image is output with cut of an IR pixel in one pixel unit (Output a).

The RGB image is output by extracting a pixel unit of RGB pixels placed diagonally to the IR pixels in the one pixel unit (Output b), or by performing a 4-pixel addition and quarterly mixing an IR pixel in RGB pixels (Output c). The both resolutions of the obtained RGB image and IR image are VGA.

The array of the color filter array 23a illustrated in FIG. 17 can enlarge the area of the IR transmission filter. When the size of a cell in the image sensor 23 becomes about 1.5 μm, an IR transmission filter having a film thickness about twice as the R, G, B color filters may easily come off during a manufacturing process. A stable IR transmission filter can be thus formed by enlarging the area of the IR transmission filter.

Further, regarding the RGB pixels, when the pixels are output as the Output b of FIG. 17, a mutual interference between the RGB pixels and the IR pixel can be minimized, and when the pixels are output as the Output C in FIG. 17, the output of the RGB pixels is tripled compared to the Output b and this realizes a better face detection under a low illumination environment although a noise caused by the IR pixel is included.

When a function required as a function of the monitoring camera is a face detection only, color information is not required in the image as a face detection target. Thus, a black-and-white image may be obtained as a substitute for the RGB image by penetrating all the visual light range of the R, G, B color filters in the color filter array 23a to make the pixels corresponding to the color filter as white pixels.

Figure 18:
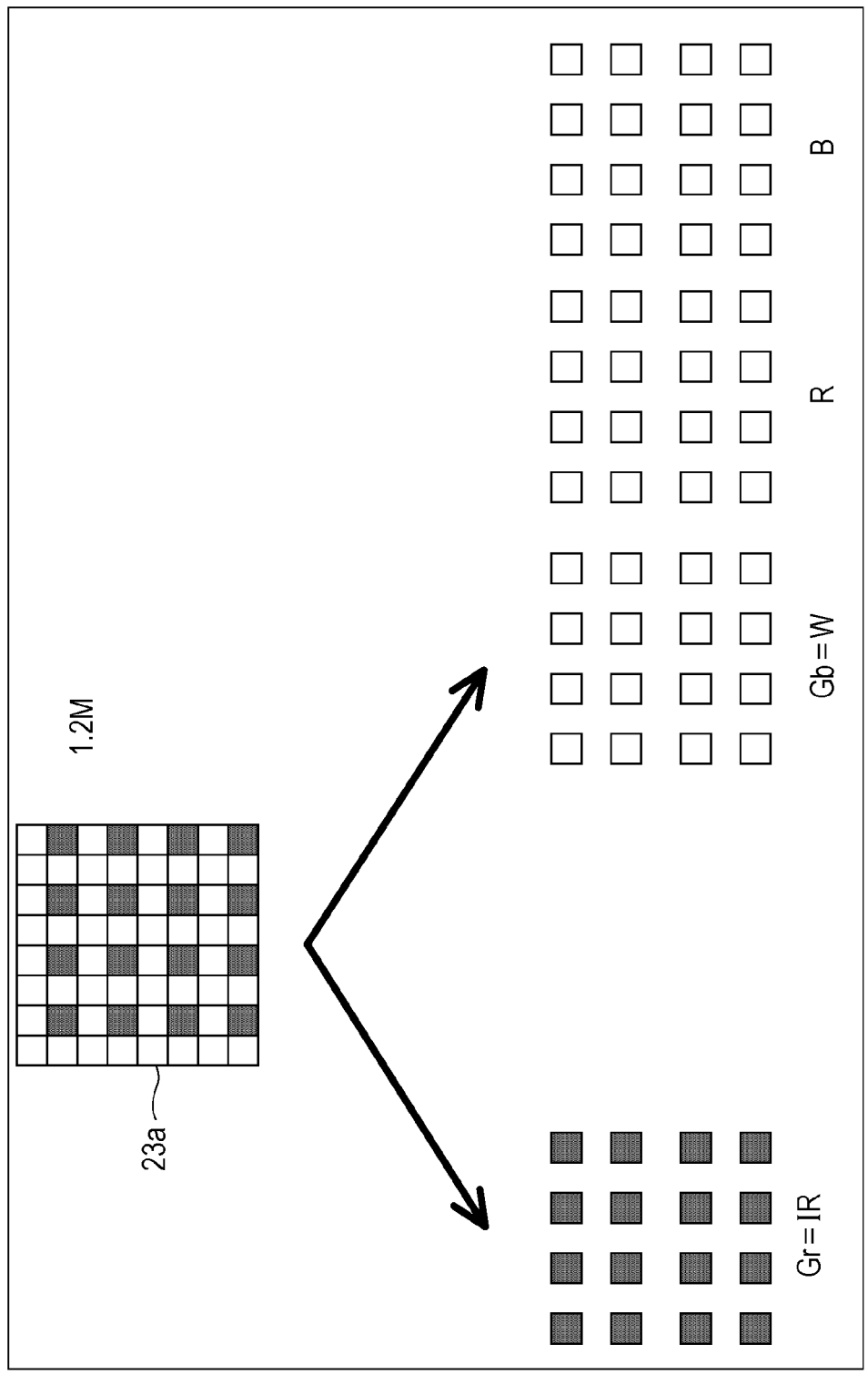
FIG. 18 is a diagram explaining output examples of the RGB pixel and the IR pixel.

FIG. 18 illustrates an example of pixel outputs in which the R, Gb (or Gr), B pixels are made as white pixels in the pixel outputs illustrated in FIG. 6. In order to simplify the explanation, the number of pixels is made to be 1.2 M. According to the example of FIG. 18, a black and white image obtained by demosaicing an output with some cut of white pixels corresponding to the R, Gb (or Gr), B pixels (RGB pixels) and an IR image obtained by demosaicing an output with some cut of Gr (or Gb) pixels (IR pixel) can be obtained. A sensitivity of the black and white image obtained in this manner almost triples that of the RGB image since deterioration is not caused by R, G, B color filters. Further, in the example of FIG. 18, the resolution of the image sensor 23 is made to be 1.2 M and the resolutions of the black and white image and the IR image are made to be 1.2 M and VGA, respectively.

Figure 19:
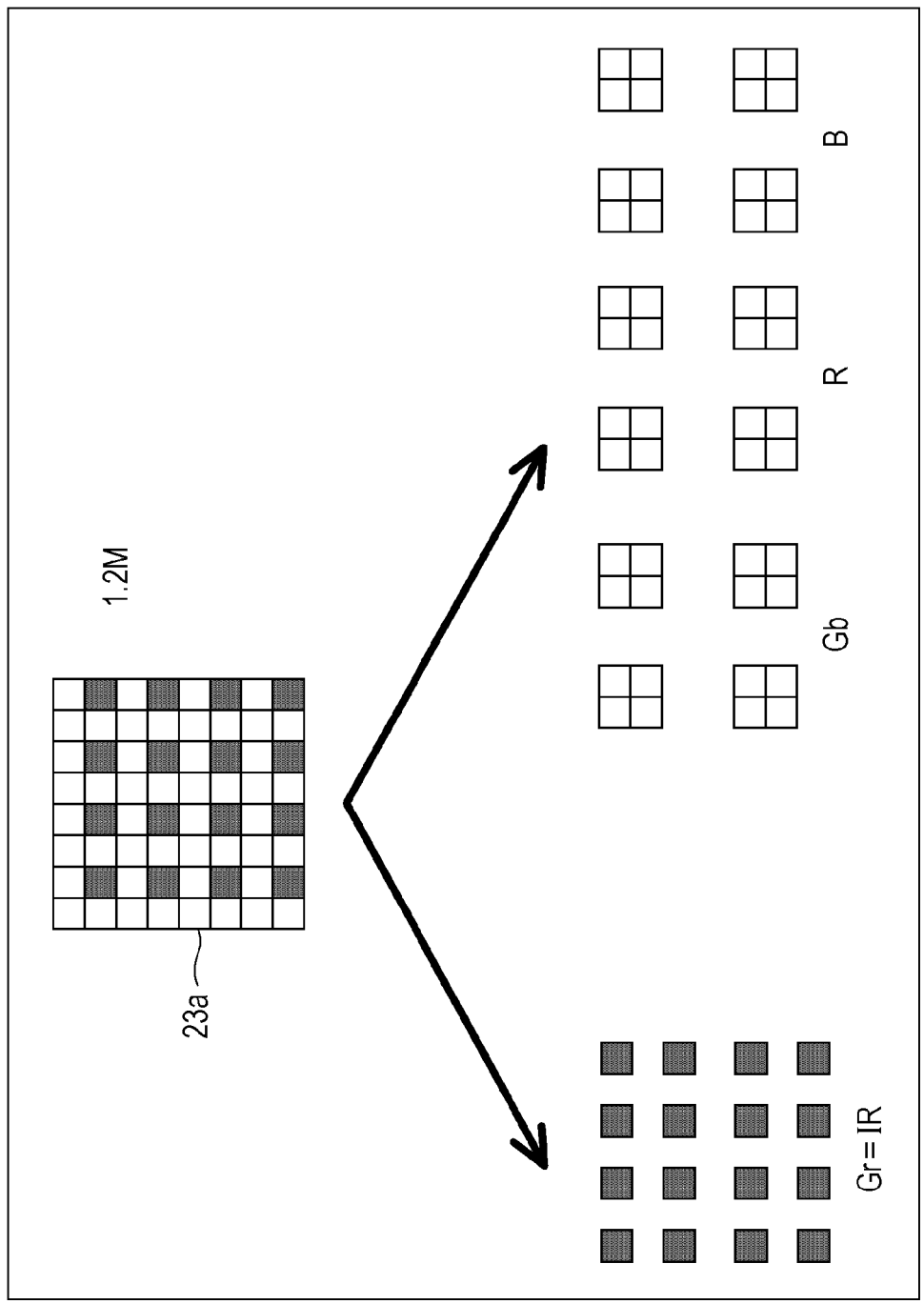
FIG. 19 is a diagram explaining output examples of the RGB pixel and the IR pixel.

FIG. 19 illustrates an example of pixel outputs in which the R, Gb (or Gr), B pixels are made as white pixels in the pixel outputs illustrated in FIG. 9. In this case, also, in order to simplify the explanation, the number of pixels is made to be 1.2 M. According to the example of FIG. 19, a 4-pixel addition is performed on the white pixels corresponding to the R, Gb (or Gr), B pixels (RGB pixel) to output. In this case, since three pixel cells out of four pixel cells can be output as white pixels, the sensitivity of the black and white image further triples and becomes ninefold compared to the RGB image. Therefore, even when the user 10 and the display control device 11 are in a darker illumination environment, a robust face detection can be performed.

Figure 20:
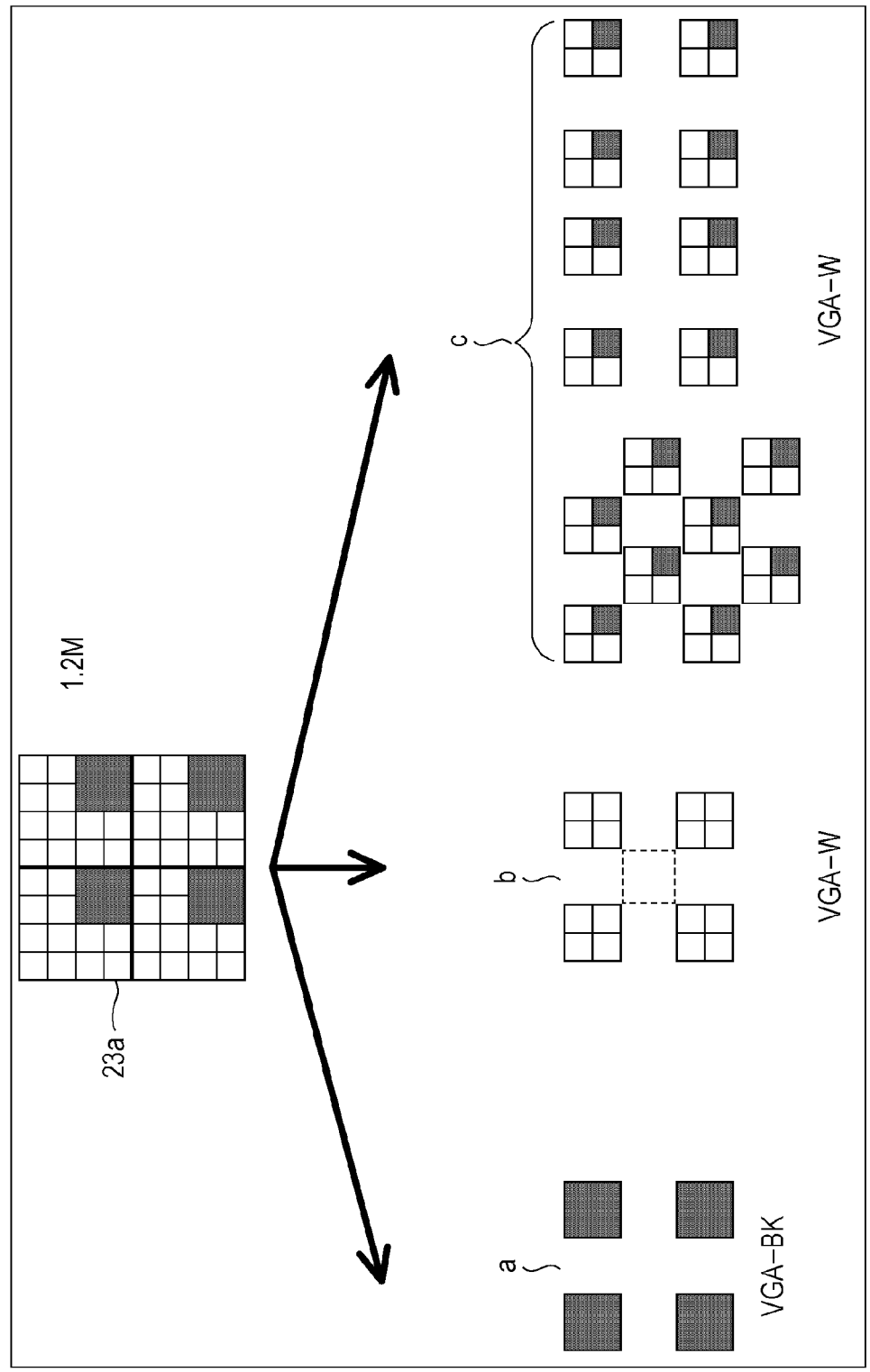
FIG. 20 is a diagram explaining output examples of the RGB pixel and the IR pixel.

FIG. 20 illustrates an example of the pixel outputs in which the R, G, B pixels are made as white pixels in the pixel outputs illustrated in FIG. 17. In the example of FIG. 20, a higher sensitivity of black and white images compared to the RGB image can be obtained in addition to the same effects of the example of FIG. 17.

Although the above description explains a cursor display control process in which the display control device monitors a viewing condition of a single user (viewer), the number of users whose viewing condition is monitored by the display control device is not always one. Thus, in the following description, a cursor display control process in which the number of users whose viewing condition is monitored by the display control device is plural.

2. Second Embodiment

[Example of Functional Configuration of Display Control Device]

Figure 21:
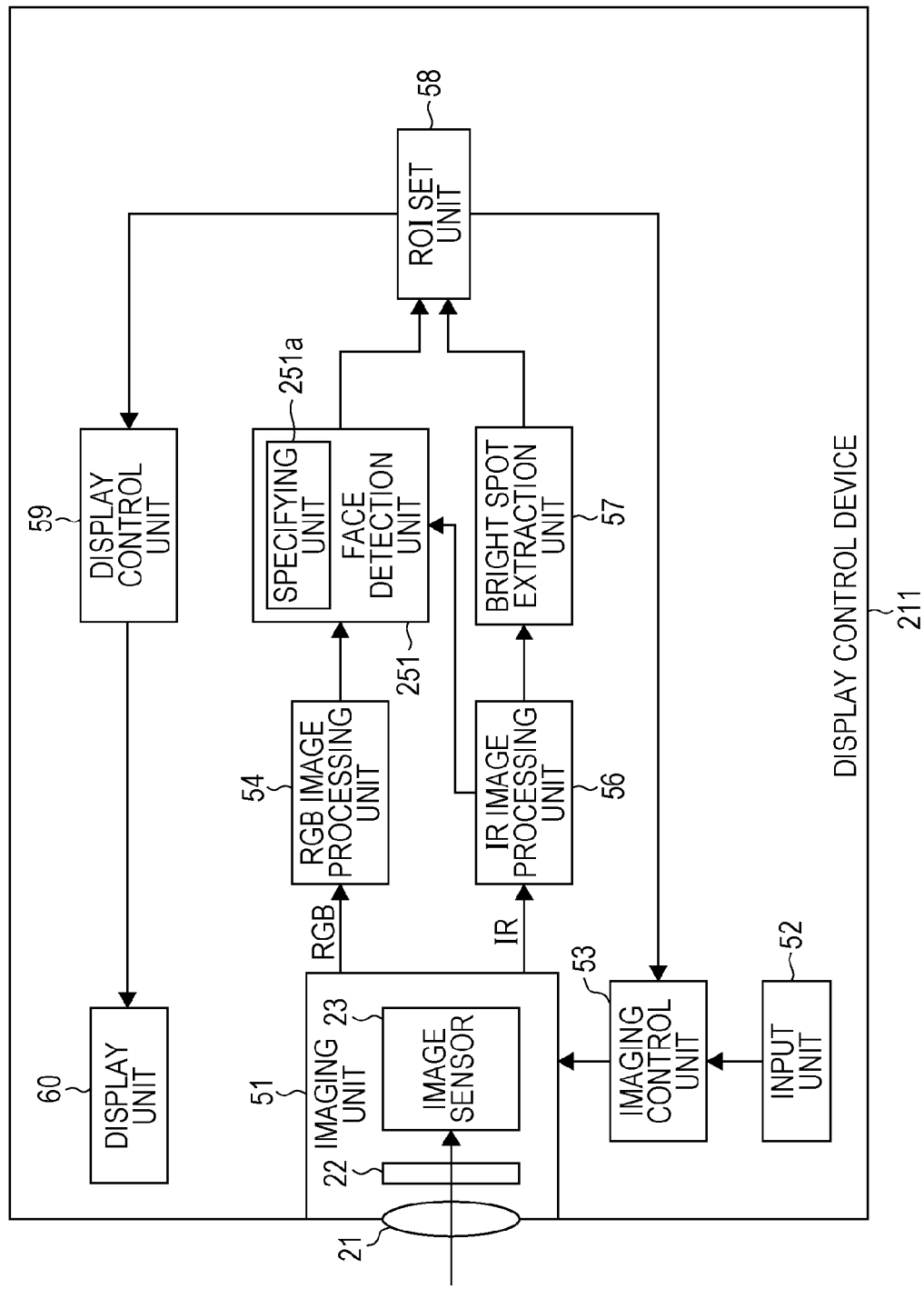
FIG. 21 is a block diagram illustrating a functional configuration example of a second embodiment of the display control device to which the present technique is applied.

FIG. 21 illustrates a functional configuration example of a second embodiment of a display control device to which the present technique is applied.

In a display control device 211 of FIG. 21, the components having the same function as those provided in the display control device 11 of FIG. 7 are illustrated with the same names and reference numbers and explanation thereof will be omitted.

Regarding the display control device 211 of FIG. 21, a difference with the display control device 11 of FIG. 7 is that a face detection unit 251 is provided in place of the face detection unit 55.

The face detection unit 251 includes a specifying unit 251a in addition to the same function with the face detection unit 55 of FIG. 7. When there are more than one faces detected in the RGB image from the RGB image processing unit 54, the specifying unit 251a obtains an IR image from the IR image processing unit 56 and specifies a user as an operator based on the IR image and the RGB image.

[Regarding Cursor Display Control Process]

Figure 22:
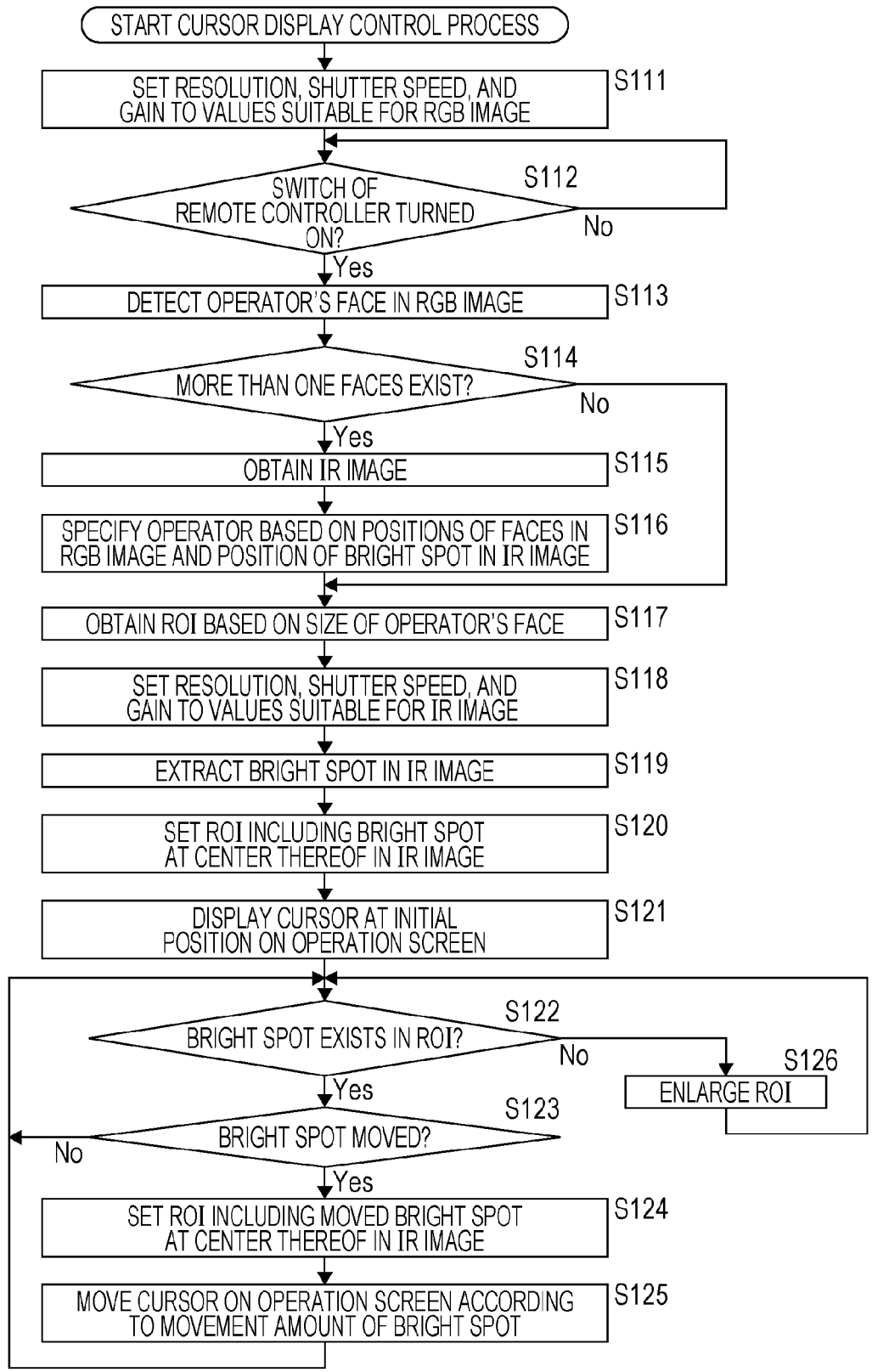
FIG. 22 is a flowchart explaining a cursor display control process of the display control device of FIG. 21.

Next, referring to the flowchart of FIG. 22, a cursor display control process by the display control device 211 of FIG. 21 will be explained.

Since processes in steps S111 to S113 and S117 to S126 of the flowchart of FIG. 21 are basically same as the processes in steps S11 to S13 and S14 to S23 of the flowchart in FIG. 8, explanations thereof will be omitted.

Figure 23:
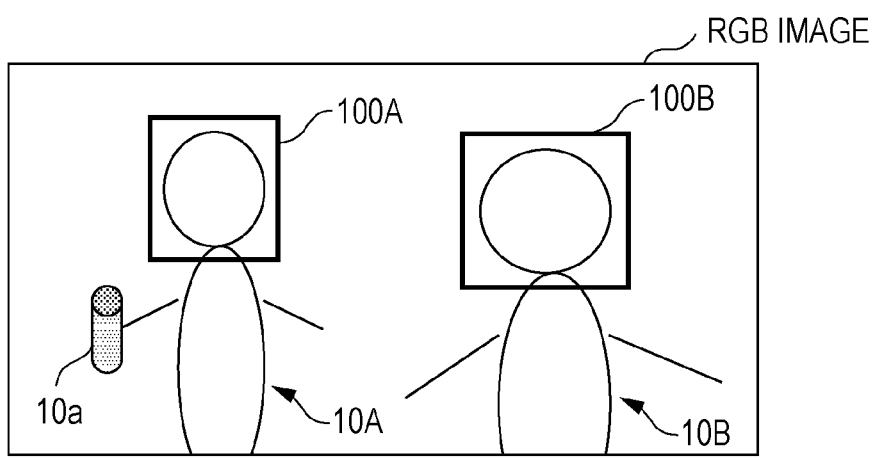
FIG. 23 is a diagram explaining a face detection in the RGB image.

In step S114, the face detection unit 251 determines whether there are more than one faces detected in the RGB image from the RGB image processing unit 54 in step S113. For example, as illustrated in FIG. 23, when faces of two users 10A and 10B are detected in the RGB image, detection frames 100A and 100B are set to the detected faces respectively. The face detection unit 251 determines whether more than one faces exist by determining whether more than one detection frames have been set.

When it is determined that more than one faces exist in step S114, the process proceeds to step S115 and the face detection unit 251 obtains, from IR image processing unit 56, an IR image in a frame occurred simultaneously with the frame of the RGB image in which the faces are detected.

In step S116, the specifying unit 251a of the face detection unit 251 specifies the user as the operator of the remote controller 10a based on the position of the face in the RGB image and the position of the bright spot in the IR image.

Figure 24:
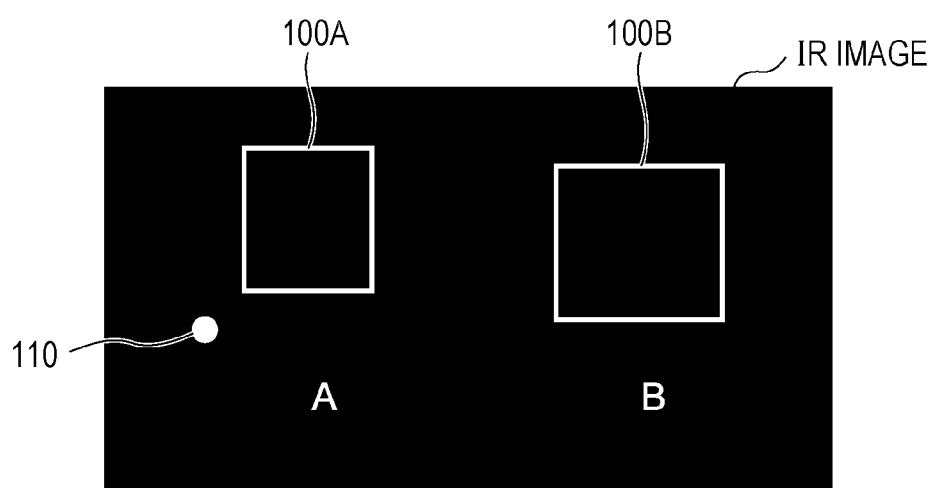
FIG. 24 is a diagram explaining a bright spot extraction in an IR image.

Concretely, as illustrated in FIG. 24, the specifying unit 251a extracts the bright spot 110 in the IR image obtained from the IR image processing unit 56 and sets the detection frames 100A and 100B, which are set to the RGB image, at a corresponding position in the IR image. Then, the specifying unit 251a calculates distances between the bright spot 110 and the center positions of the detection frames 100A and 100B in the IR image, and specifies the user 10A corresponding the detection frame 100A with the shortest distance as the operator of the remote controller 10a. After that, the specifying unit 251a provides the size, in the RGB image, of the face (detection frame 100A) of the specified user 10A to the ROI set unit 58.

According to the above process, even when there are plural users in the RGB image, the user as the operator is specified, the ROI determined according to the size of the specified user is always set with the bright spot of the IR image at the center thereof, and the cursor on the operation screen is moved according to the movement amount of the bright spot in the ROI. In other words, the cursor on the operation screen can be moved only at the stroke amount of the user's arm without obtaining distances from the display control device to respective users or regardless of the distance from the user as the operator. Therefore, regarding the free-cursor type user interface, user's operation can be improved without requiring to perform calibration each time or obtain a distance between the camera and the operator in order to obtain the distance between the camera and the operator.

In the above description, a configuration in which a process for the RGB image and a process for the IR image are serially performed has been explained. This configuration can be applied to a configuration in which a free-cursor type user interface is applied to a camera system for monitoring a viewing condition of a viewer.

In the following description, an example that the present technique is applied to a configuration in which a free-cursor type user interface is applied to a camera system for performing communication via a network such as the Internet.

3. Third Embodiment

[Example of Functional Configuration of Display Control Device]

Figure 25:
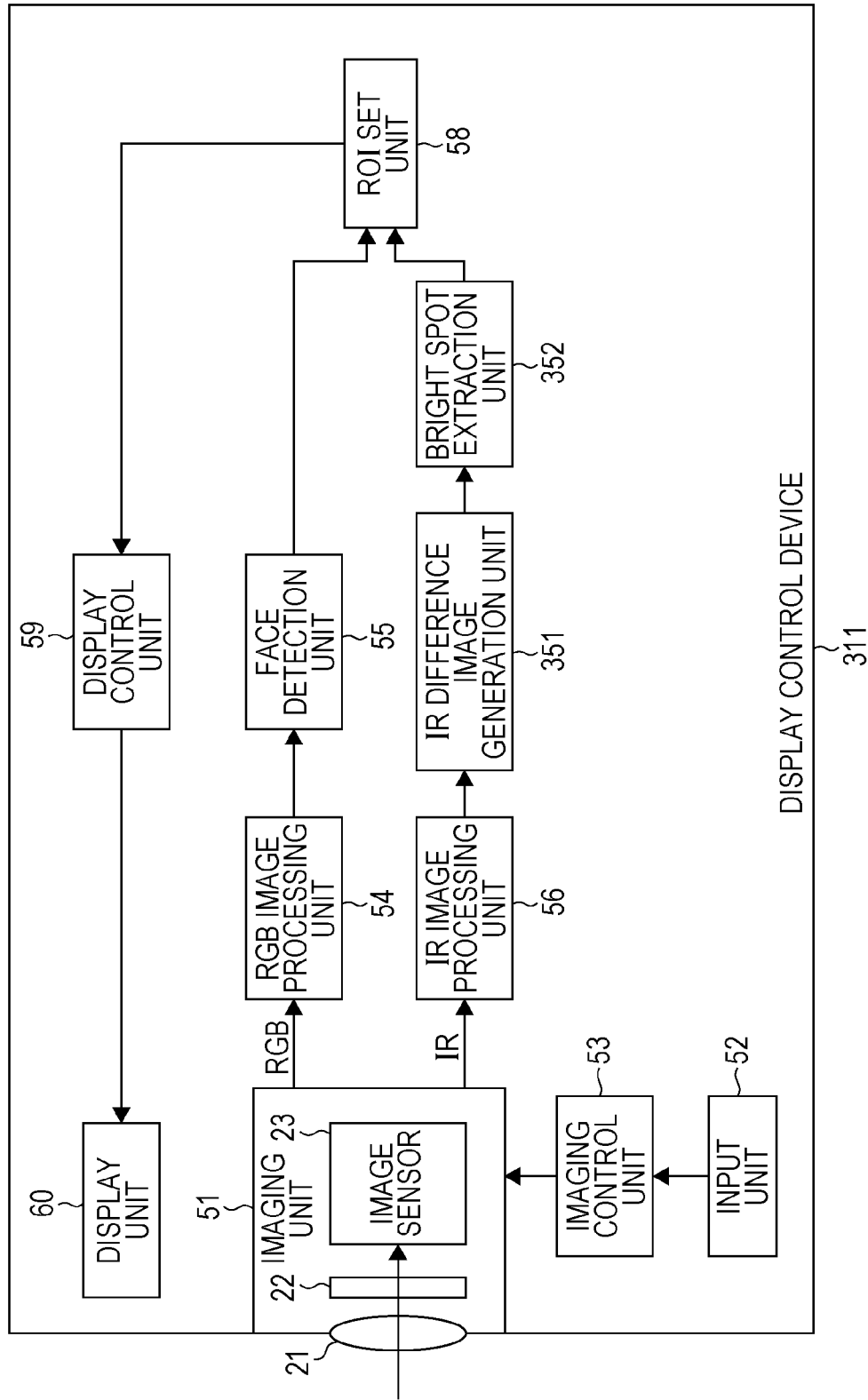
FIG. 25 is a block diagram illustrating a functional configuration example of a third embodiment of the display control device to which the present technique is applied.

FIG. 25 illustrates a functional configuration example of a third embodiment of a display control device to which the present technique is applied.

In a display control device 311 of FIG. 25, the components having the same function as those provided in the display control device 11 of FIG. 7 are illustrated with the same names and reference numbers and explanation thereof will be omitted.

In the display control device 311 of FIG. 25, a difference with the display control device 11 of FIG. 7 is that an IR difference image generation unit 351 is newly provided and a bright spot extraction unit 352 is provided in place of the bright spot extraction unit 57.

The IR difference image generation unit 351 has a buffer for storing an IR image of a previous frame (previous frame IR image) and generates an IR difference image which is a difference between an IR image (current frame IR image) from the IR image processing unit 56 and a previous frame IR image stored in the buffer. The IR difference image generation unit 351 provides the generated IR difference image and the current frame IR image to the bright spot extraction unit 352.

The bright spot extraction unit 352 extracts a bright spot in the IR difference image from the IR difference image generation unit 351 and provides the IR difference image in which the bright spot is extracted and the current frame IR image to the ROI set unit 58.

Figure 26:
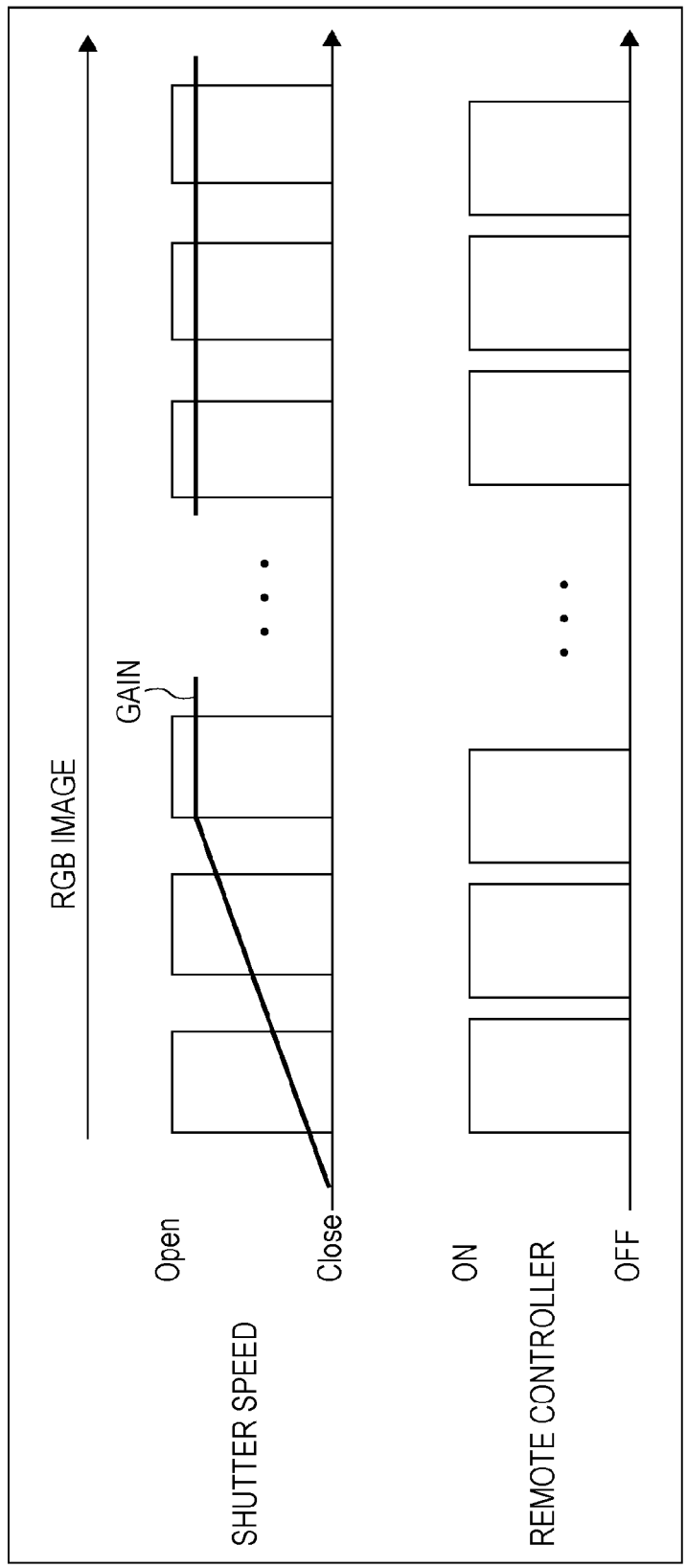
FIG. 26 is a flowchart explaining a cursor display control process of the display control device of FIG. 25.

In this embodiment, a process on the RGB image (a process performed for video communication) and a process on the IR image (a process for tracking the bright spot) are performed in parallel. Thus, it is difficult in a hardware configuration to use cutting and pixel addition at the same time as a pixel output. Further, in a camera system for performing video communication, an image with a high quality can be obtained same as a typical digital camera. Because of the above, in this embodiment, a resolution is set to be only a value suitable for the RGB image and, as illustrated in FIG. 26, a shutter speed and gain are set to be only values suitable for the RGB image.

[Regarding Cursor Display Control Process]

Next, referring to the flowchart of FIG. 27, a cursor display control process by the display control device 311 of FIG. 25 will be explained.

Figure 27:
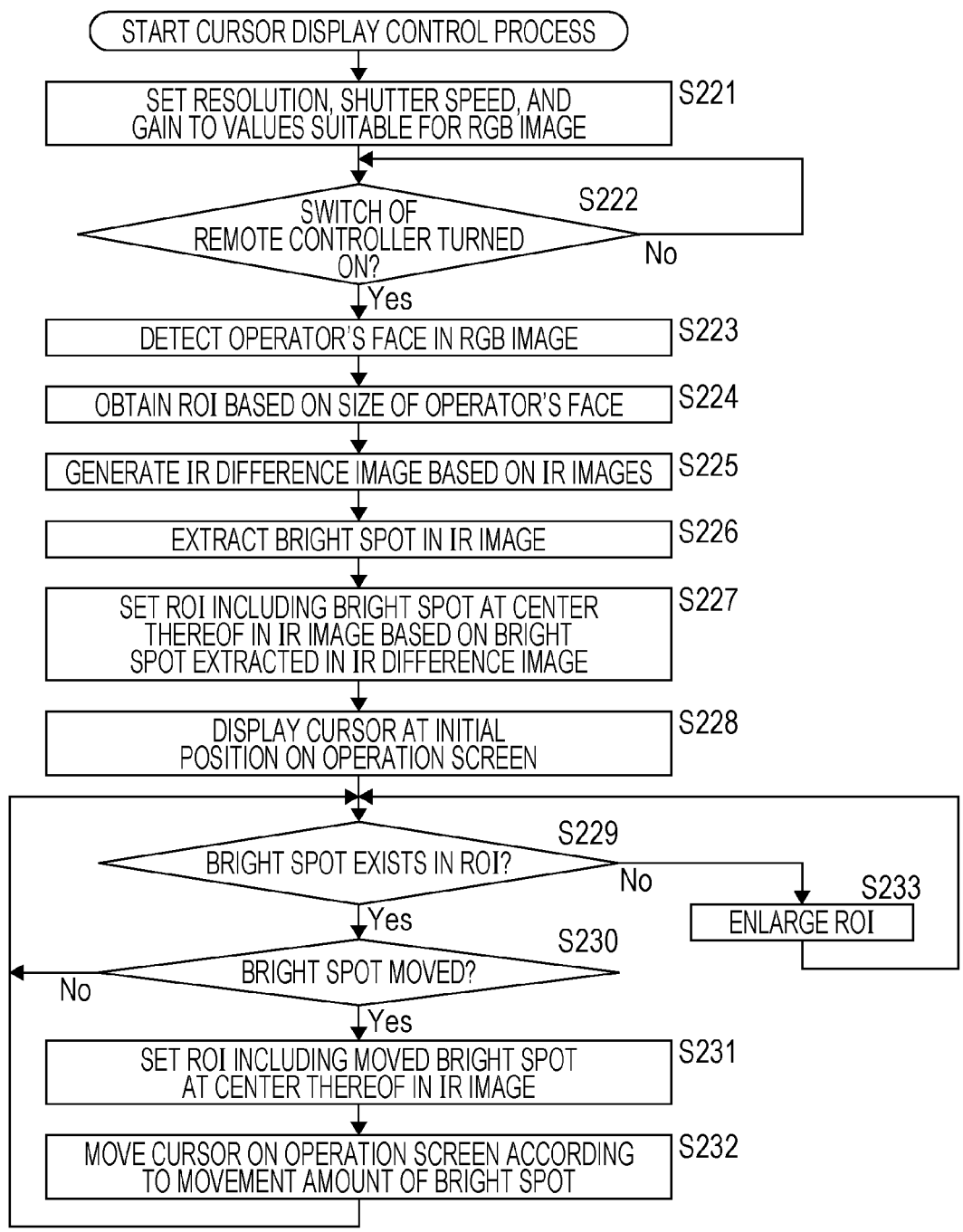
FIG. 27 is a diagram explaining a shutter speed and gain.

Since the processes in steps S221 to S224 and S228 to S233 of the flowchart of FIG. 27 are basically same as the processes in steps S11 to S14 and S18 to S23 of the flowchart of FIG. 8, explanations thereof are omitted.

In step S225, the IR difference image generation unit 351 generates an IR difference image based on the current frame IR image from the IR image processing unit 56 and the previous frame IR image stored in the buffer and provides the IR difference image to the bright spot extraction unit 352 together with the current frame IR image.

In step S226, the bright spot extraction unit 352 extracts a bright spot in the IR difference image from the IR difference image generation unit 351 and provides the IR difference image in which the bright spot is extracted to the ROI set unit 58 together with the current frame IR image.

In step S227, the ROI set unit 58 specifies the bright spot in the current frame IR image based on the bright spot extracted in the IR difference image from the bright spot extraction unit 352, and sets the ROI whose size has been obtained in step S224 so as to center the bright spot thereof in the current frame IR image.

In this manner, the bright spot in the IR image can be tracked by performing an extraction of the bright spot based on the IR difference image.

Figure 28:
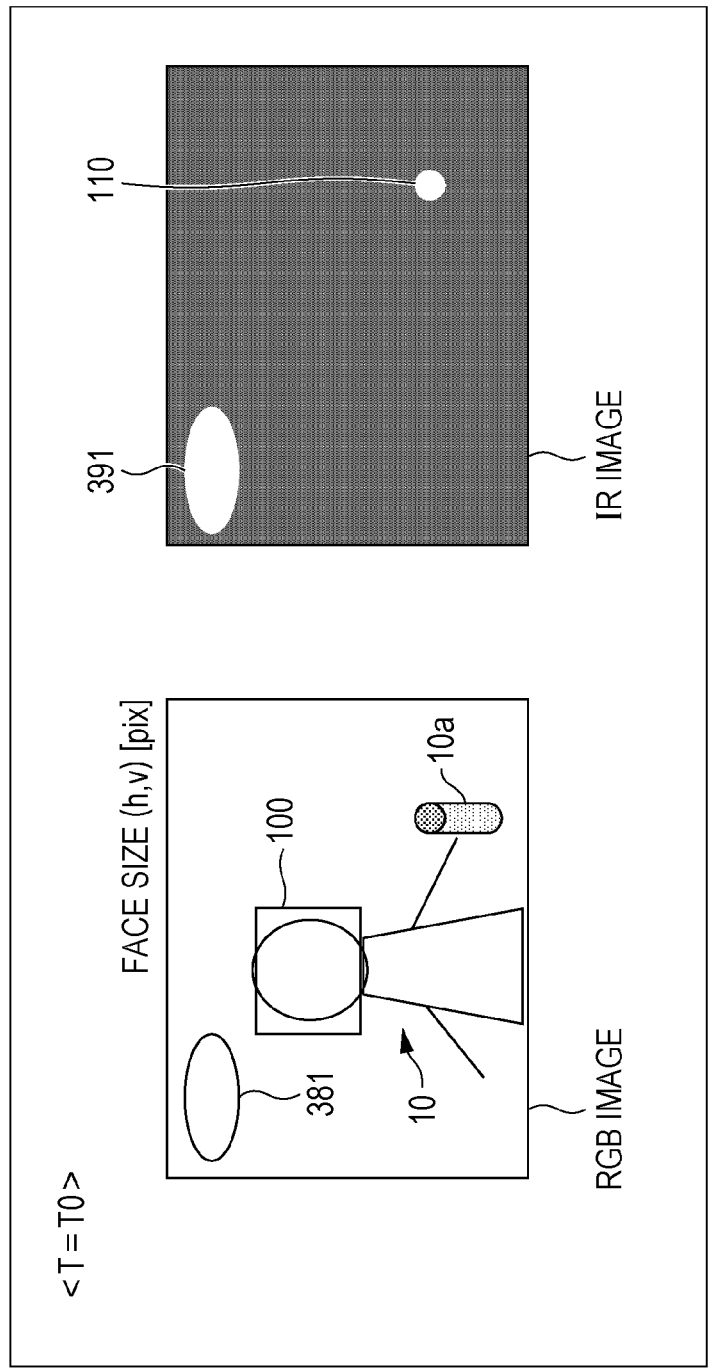
FIG. 28 is a diagram explaining a bright spot extraction in an IR difference image.
Figure 29:
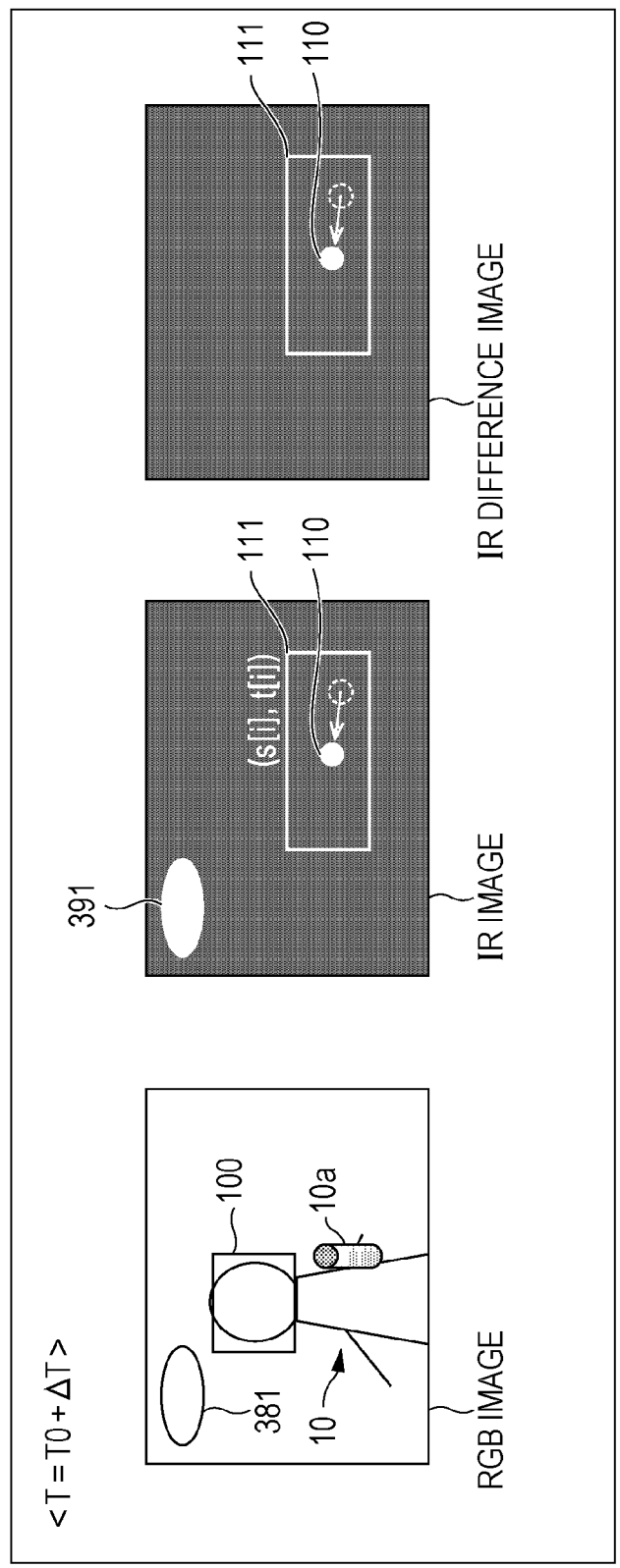
FIG. 29 is a diagram explaining the bright spot extraction in the IR difference image.
Figure 30:
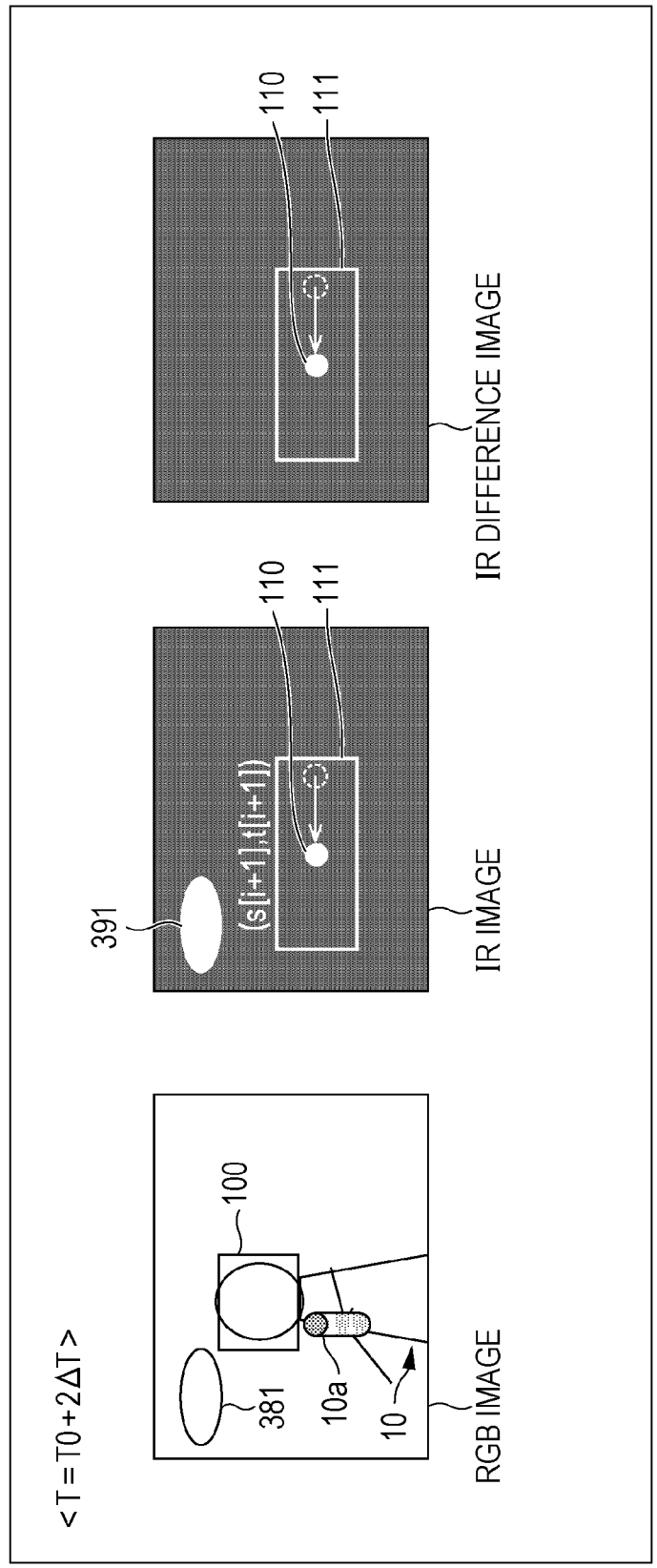
FIG. 30 is a diagram explaining the bright spot extraction in the IR difference image.

Referring to FIGS. 28 to 30, tracking a bright spot in the IR image by performing an extraction of the bright spot based on the IR difference image will be explained in detail. FIG. 28 illustrates an example of an RGB image and an IR image in an initial condition (time T=T0), that is, in the first frame; and FIGS. 29 and 30 illustrates an example of the RGB image, the IR image, and the IR difference image after time $\Delta T$ and after time $2\Delta T$ from the initial condition, respectively. Here, although the process on the RGB image is not performed in tracking of the bright spot in the IR image, for the purpose of explaining, the RGB image is also illustrated with the IR image and the IR difference image.

Since a camera system which performs video communication is installed indoors in general, in the RGB images of FIGS. 28 to 30, there is a light source 381 which emits light such as a light from a illumination lamp placed in a room or a reflection light of an outside light reflected by a mirror or the like. Thus, in the IR images of FIGS. 28 to 30, in addition to the bright spot 110 as the LED of the remote controller 10*a* held by the user 10, a light source 391 corresponding to the light source 381 in the RGB image exists. The light source 391 is a result of a pixel output, which is caused by an incidence of a large amount of light in a visual light range, in an IR image taken at a shutter speed suitable for the RGB image, and the pixel output is to be equal to or greater than the pixel output by the infrared light of the LED of the remote controller 10*a*.

Firstly, as illustrated in FIG. 28, in time T=T0, it cannot be determined which of the bright spot 110 and the light source 391, in the IR image, is made by the infrared light of the LED of the remote controller 10*a*, and thus an ROI cannot be set in the IR image.

Next, as illustrated in FIG. 29, in time T=T0+ΔT, the remote controller 10*a* is swung by the user 10, and the bright spot 110 moves by a vector (s[i], t[i]) in the IR image from the condition at time T=T0. At this time, an IR difference image is generated based on the current frame IR image at time T=T0+ΔT and the previous frame IR image at time T=T0. Here, in the IR difference image, regarding a pixel whose difference value is negative, the difference value is set as zero. Thus, in the IR difference image, the light source 391 which does not move is canceled by the difference, and only the bright spot 110 which is made by the infrared light of the LED of the remote controller 10*a* moved by the swing by the user 10 exists. With this, a bright spot is extracted in the IR difference image. Then, the ROI 111 is set so as to include the bright spot 110, which is extracted in the IR difference image, at the center thereof in the IR image.

Then, as illustrated in FIG. 30, it is assumed that the remote controller 10*a* is further swung by the user 10 at time T=T0+2ΔT, and the bright spot 110 moves in the IR image by a vector (s[i+1], t[i+1]) from a condition at time T=T0+ΔT. In this case, an IR difference image is generated based on the current frame IR image at time T=T0+2ΔT and the previous frame IR image at time T=T0+ΔT. In this case, a frame difference process for generating an IR difference image may be performed only on an area corresponding to the ROI 111 set at time T=T0+ΔT. Then the bright spot 110 is extracted in the IR difference image, and the ROI 111 is set so as to include the bright spot 110, which is extracted in the IR difference image, at the center thereof in the IR image.

According to the above process, even when the present technique is applied to a camera system for performing video communication, the ROI, which is determined according to the size of the user's face in the RGB image, is set so as to always include the bright spot in, which is extracted based on the IR difference image, at the center thereof in the IR image, and the cursor on the operation screen is made to move according to the movement amount of the bright spot in the ROI. In other words, the cursor on the operation screen can be moved at an arm stroke amount that the user does not feel stressed without obtaining the distance from the display control device to the user and regardless of the distance from the user. Therefore, regarding the free-cursor type user interface, user's operation can be improved without requiring to perform calibration each time or obtain a distance between the camera and the operator in order to obtain the distance between the camera and the operator.

In this embodiment, the shutter speed is set to only a value which is suitable for the RGB image by performing the process on the RGB image and the process on the IR image in parallel. In other words, since a shatter open time is extended in order to obtain a sensitivity in the RGB image, the bright spot is surely extracted by movement detection using the IR difference images although the SNR of the bright spot extraction in the IR image is lowered due to background noise in a living room with bright outside light or a room in which a white fluorescent lamp is used as an illumination. This allows the user to operate the cursor on the operation screen while performing video communication.

When the face detection unit 251 of FIG. 21 is provided in the display control device 311 of FIG. 25 as a substitute of the face detection unit 55, effects relevant to the above described effects can be obtained even when the number of user is plural.

According to the above description, a user interface is provided in which the stroke amount of the user's arm is obtained based on the face size of the user (twice a face size, for example) and a required arm stroke amount does not depend on the distance when the user uses a free-cursor type user interface provided by the above explained display control device. However, many of the users handle the remote controller like a laser pointer without thinking to operate. In other words, it is considered that the user may handle the remote controller with an arm stroke corresponding to the distance from the display control device. Concretely, the arm stroke amount of the user may become small when the distance from the display control device (display) is small, and the arm stroke amount of the user may become large when the distance from the display is large. In such a case, it is preferable that the size of the ROI corresponds to the largeness of the distance between the display control device and the user, that is, the largeness corresponding to the arm stroke amount of the user.

In the following, a configuration to obtain the size of the ROI according to the distance between the display control device and the user will be explained.

4. Fourth Embodiment

[Example of Functional Configuration of Display Control Device]

Figure 31:
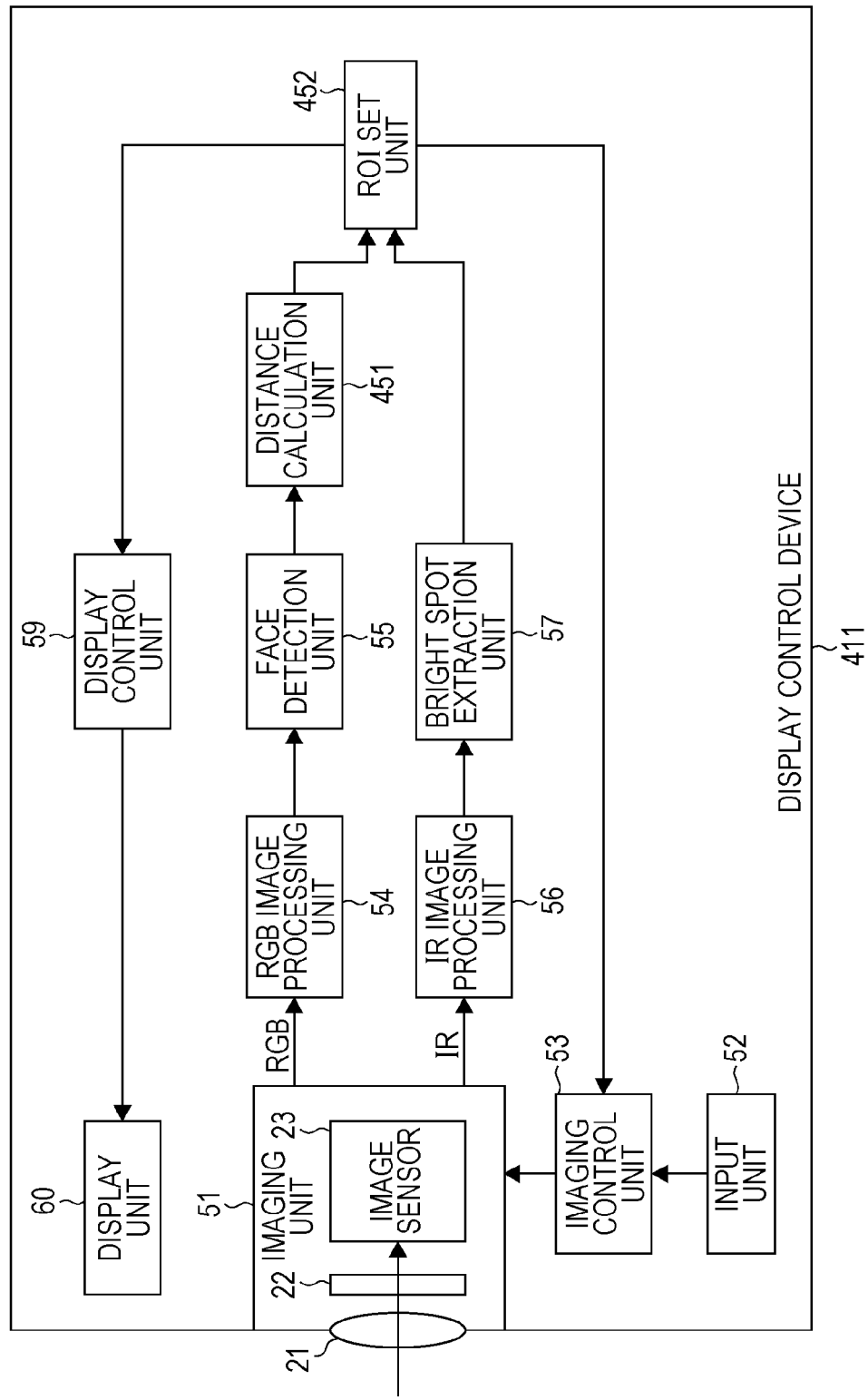
FIG. 31 is a block diagram illustrating a functional configuration example of a fourth embodiment of the display control device to which the present technique is applied.

FIG. 31 illustrates a functional configuration example of a fourth embodiment of a display control device to which the present technique is applied.

In a display control device 411 of FIG. 31, the components having the same function as those provided in display control device 11 of FIG. 7 are illustrated with the same names and reference numbers and explanation thereof will be omitted.

In the display control device 411 of FIG. 31, the difference with the display control device 11 of FIG. 7 is that a distance calculation unit 451 is newly provided and an ROI set unit 452 is provided in place of the ROI set unit 58.

The distance calculation unit 451 calculates a distance between the display control device 411 and a user based on a size of the user's face, which is detected by the face detection unit 55, in an RGB image, and provides the calculated distance to the ROI set unit 452.

The ROI set unit 452 obtains the size of the ROI based on the distance between the display control device 411 and the user from the distance calculation unit 451. Further, the ROI set unit 452 sets the ROI, whose size has been obtained, so as to include the bright spot at the center thereof in the IR image, in which the bright spot is extracted, from the bright spot extraction unit 57. Then, when the bright spot moves in the set ROI, the ROI set unit 452 provides the movement amount of the bright spot in the ROI to the display control unit 59.

[Regarding Cursor Display Control Process]

Next, referring to the flowchart of FIG. 32, a cursor display control process by the display control device 411 of FIG. 31 will be explained.

Figure 32:
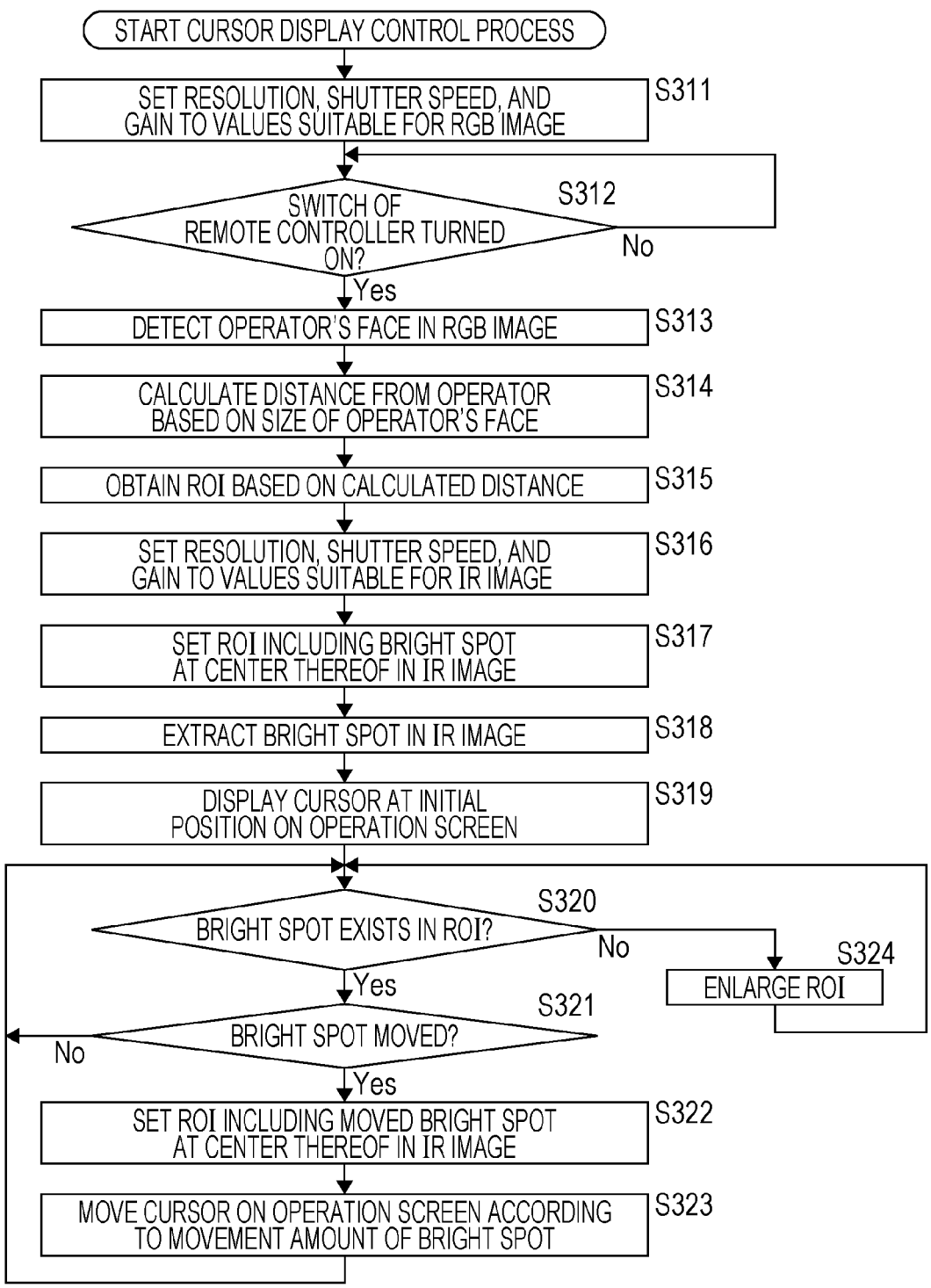
FIG. 32 is a flowchart explaining a cursor display control process of the display control device of FIG. 31.

Since the processes in steps S311 to S313 and S316 to S324 in the flowchart of FIG. 32 are basically same as the processes in steps S11 to S13 and S15 to S23 in the flowchart of FIG. 8, explanations thereof will be omitted.

In step S314, the distance calculation unit 451 calculates the distance between the display control device 411 and the user based on the face size of the user as the operator in the RGB image from the face detection unit 55 and provides the calculated distance to the ROI set unit 452.

It is assumed that the number of user taken an image by the imaging unit 51 is one, and the positions of the LED of the remote controller held by the user and the user in the distance direction are the same. Further, a horizontal viewing angle and a vertical viewing angle of the imaging unit 51 are set to be FOVx and FOVy respectively, and the number of pixels of the image sensor 23 is set as Px×Py. Further, the size of the user's face (detection frame) detected in the RGB image is set as (h, v)[pix] and an actual size of an average person's face is set as BLx[mm] in width and Bly[mm] in height. Here, for the purpose of simplifying, the face size detected in the RGB image is assumed to be handled only in one dimension in a horizontal direction (crosswise direction).

Firstly, when the average person's actual face size BLx is used as a standard, since the actual size per one pix (pixel) is BLx/h, a visual size in the horizontal direction is expressed as follows.

[Equation 3]
$$\frac{Px \times BLx}{h}$$

On the other hand, when the distance between the display control device 411 and the user is Distance D, the visual size is expressed as follows.

[Equation 4]
$$2D \times \tan\left(\frac{FOV_x}{2}\right)$$

Thus, the Distance D between the display control device 411 and the user is expressed in the following equation (1).

[Equation 5]
$$D = \frac{Px \times BLx}{2h \times \tan\left(\frac{FOV_x}{2}\right)} \quad (1)$$

In this manner, the Distance D between the display control device 411 and the user is calculated based on the size of the user's face in the RGB image.

Referring back to the flowchart of FIG. 32, in step S315, the ROI set unit 452 obtains the size of the ROI based on the Distance D between the display control device 411 and the user from the distance calculation unit 451.

For example, regarding the size of the ROI, a function of the Distance D is defined in advance and the size of the ROI is determined according to the Distance D calculated by the distance calculation unit 451. Further, a table in which the size of the ROI and the Distance D are associated may be prepared in advance and the size of the ROI may be determined based on the table. Here, the function of the Distance D or the table associating the ROI and the Distance D is made to be given in consideration of an operability of the user interface. For example, the above described operability matching to the arm stroke of user's operation without thinking can be obtained by setting the size of the ROI equivalent to the face size when the Distance D is small, about 1 m, and setting the size of the ROI quadruple of the face size when the Distance D is large, about 5 m, in an assumption that the size of the operation screen is 40 inches. In this case, the size of the ROI is determined based on the size of the operation screen and the Distance D.

According to the above described process, the ROI determined according to the distance between the display control device and the user, which is calculated based on the size of the user's face in the RGB image is always set so as to include the bright spot at the center thereof in the IR image, and the cursor on the operation screen is moved according to the movement amount of the bright spot in the ROI. With this, even when the distance between the display control device and the user changes, the user's operability of the free-cursor type user interface can be improved without giving a sense of discomfort to the user.

In the display control device 411 of FIG. 32, the effects relevant to the above described effects can be obtained even when the number of user is plural by providing the face detection unit 251 of FIG. 21 in place of the face detection unit 55.

Further, in the display control device 411 of FIG. 32, the IR difference image generation unit 351 of FIG. 25 may be newly provided and the bright spot extraction unit 352 of the FIG. 25 may be provided in place of the bright spot extraction unit 57 to be applied to the camera system for performing video communication.

Figure 33:
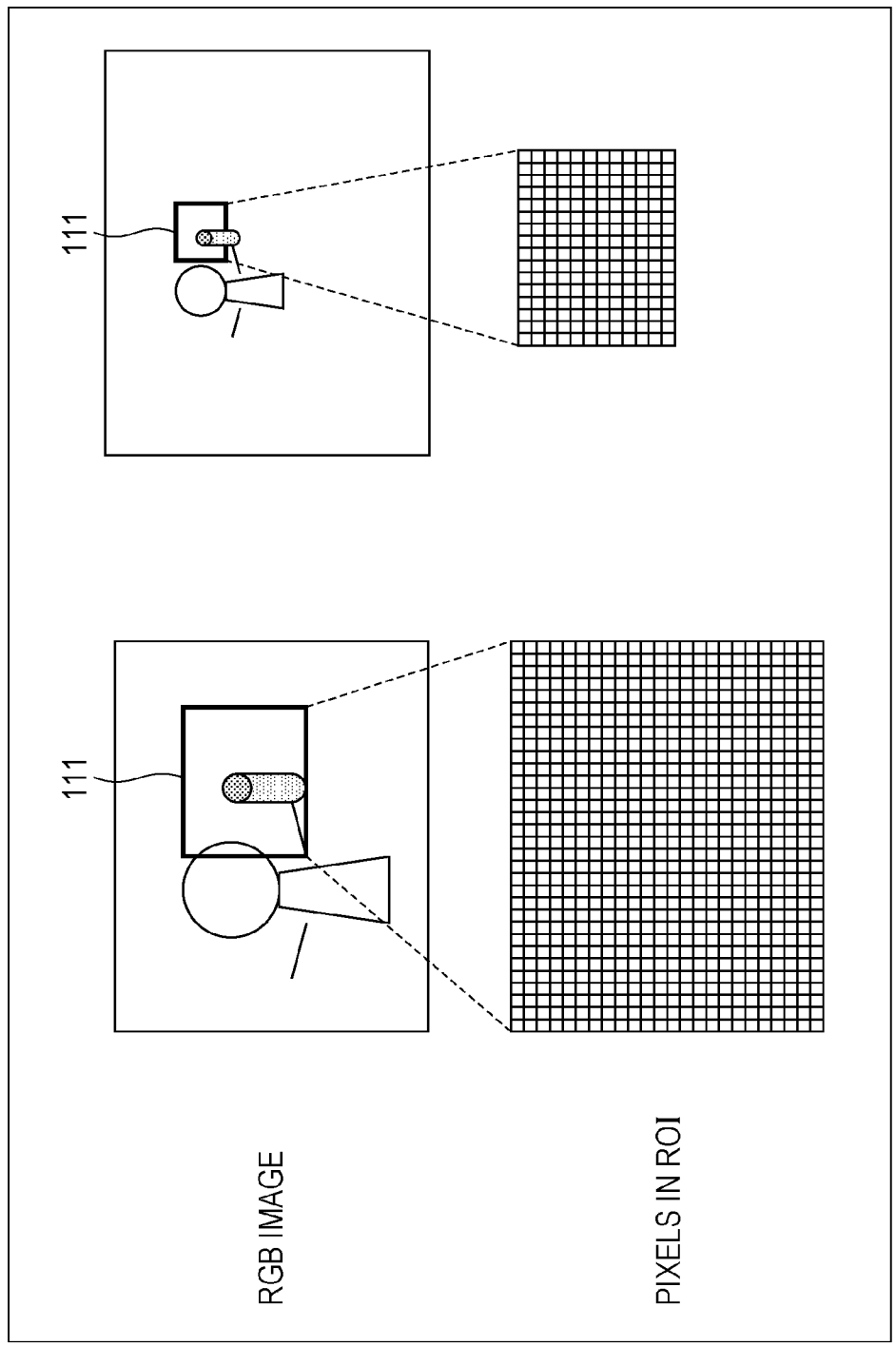
FIG. 33 is a diagram explaining a difference of the number of pixels in the ROI depending on a distance from an operator.

Since the imaging unit of the above described display control device is composed as a single focus camera, as illustrated in FIG. 33, the number of pixels included in the ROI, which is set in the IR image, varies between a case that the distance between the display control device and the user (remote controller) is small (the diagram in the left) and the case that the distance between the display control device and the user is large (the diagram in the right). Concretely, the distance between the display control device and the user becomes larger, the number of pixels included in the ROI becomes smaller.

Since the fluidity of cursor movement on the operation screen depends on the number of pixels included in the ROI, the cursor movement on the operation screen becomes clumsier as the distance between the display control device and the user is larger. Thus, in a case that the distance between the display control device and the user is large, when many menu icons are arranged on the operation screen (that is, when the largeness of the menu icons with respect to the operation screen is small), the user cannot select a desired menu icon correctly and the operability is deteriorated.

In a view of this, a configuration for changing the largeness of the menu icons on the operation screen according to the distance between the display control device and the user will be explained.

5. Fifth Embodiment

[Example of Functional Configuration of Display Control Device]

Figure 34:
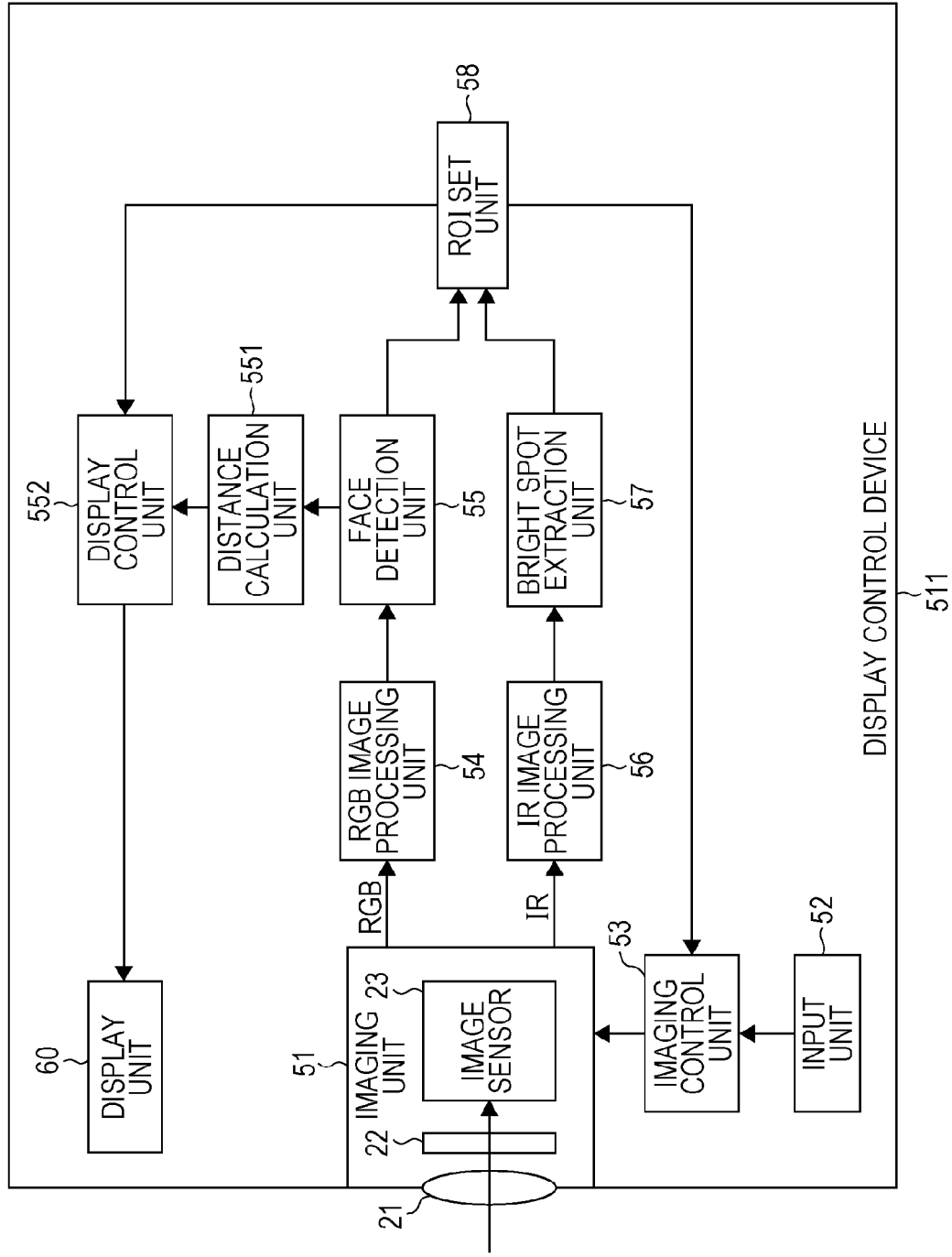
FIG. 34 is a block diagram illustrating a functional configuration example of a second embodiment of the display control device to which the present technique is applied.

FIG. 34 illustrates a functional configuration example of a fifth embodiment of a display control device to which the present technique is applied.

In the display control device 511 of FIG. 34, the components having the same function as those provided in display control device 11 of FIG. 7 are illustrated with the same names and reference numbers and explanation thereof will be omitted.

The difference with the display control device 11 of FIG. 7, in the display control device 511 of FIG. 34, a distance calculation unit 551 is newly provided and a display control unit 552 is provided in place of the display control unit 59.

The distance calculation unit 551 calculates the distance between the display control device 511 and the user based on the size of user's face in the RGB image, which is detected by the face detection unit 55, and provides the calculated distance to the display control unit 552.

The display control unit 552 determines the size of menu icons on the operation screen based on the distance between the display control device 511 and the user from the distance calculation unit 551, and displays them on the display unit 60.

[Regarding Cursor Display Control Process]

Next, referring to the flowchart of FIG. 35, a cursor display control process by the display control device 511 of FIG. 34 will be explained.

Figure 35:
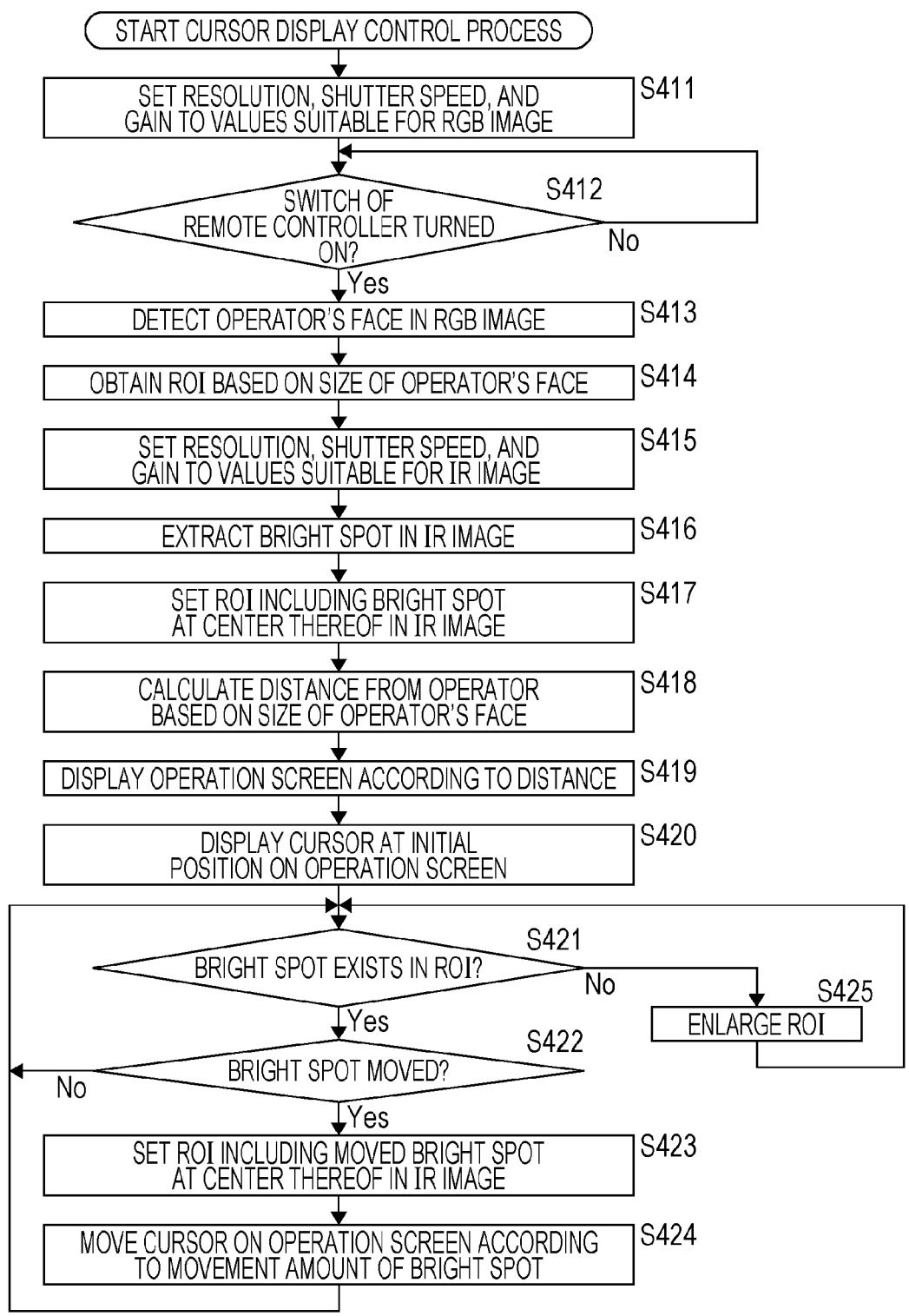
FIG. 35 is a flowchart explaining a cursor display control process of the display control device of FIG. 34.

Since processes in steps S411 to S417 and S420 to S425 in the flowchart of FIG. 35 are basically the same as the processes in steps S11 to S17 and S18 to S23 in the flowchart of FIG. 8, explanations thereof will be omitted.

In other words, in step S418, the distance calculation unit 551 calculates the distance between the display control device 511 and the user based on the face size of the user as the operator in the RGB image from the face detection unit 55, and provides the calculated distance to the display control unit 552. Concretely, the distance between the display control device 511 and the user is calculated by the above described equation (1).

Figure 36:
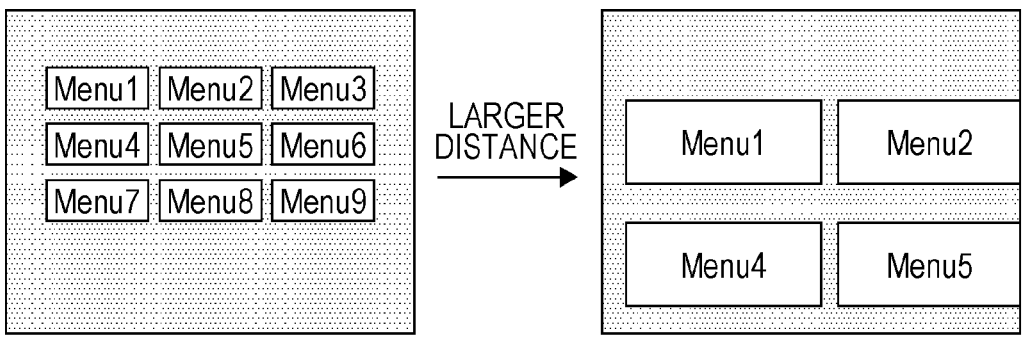
FIG. 36 is a diagram explaining a view on a display corresponding to the distance from the operator.

In step S419, the display control unit 552 determines the size of the menu icons on the operation screen based on the distance between the display control device 511 and the user from the distance calculation unit 551, and displays them on the display unit 60. Concretely, as illustrated in FIG. 36, the display control unit 552 makes the menu icons on the operation screen larger to display on the display unit 60 as the distance between the display control device 511 and the user is larger. In this case, the number of the menu icons on the operation screen is set so as to make (the number of pixels in ROI)/(the number of menu icons on operation screen) constant value.

Here, for the purpose of simplifying, it is assumed that the face size detected in the RGB image is handled only in one dimension in the horizontal direction (crosswise direction), for example, the resolution of image sensor 23 is set to VGA (Px=640, Py=480), the horizontal viewing angle FOVx of the imaging unit 51 is set to 60°, and the actual size of average person's face BLx is set to 150 mm. In this case, the face size h in the RGB image when the Distance D between the display control device 511 and the user is 5 m is h=16 (pixels) according to the above described equation (1). Here, when the face size is made twice as the arm stroke amount of the user, the arm stroke amount of the user on the RGB image is relevant to 32 pixels at maximum. In this case, the display control unit 552 sets the number of pixels on the RGB image (IR image) corresponding to a single menu icon (crosswise length) on the operation screen to 10 pixels and displays three menu icons in the crosswise direction on the operation screen.

The reason of setting the number of pixels on the RGB image corresponding to a single menu icon on to 10 pixels is to avoid an error of a cursor display position due to an accidental error (one pixel amount at a minimum) of the bright spot extraction in the IR image by the remote controller 10a from affecting user's election of menu icons.

Similarly, when the Distance D between the display control device 511 and the user is 2 m, eight menu icons are displayed in a crosswise direction on the operation screen.

Figure 37:
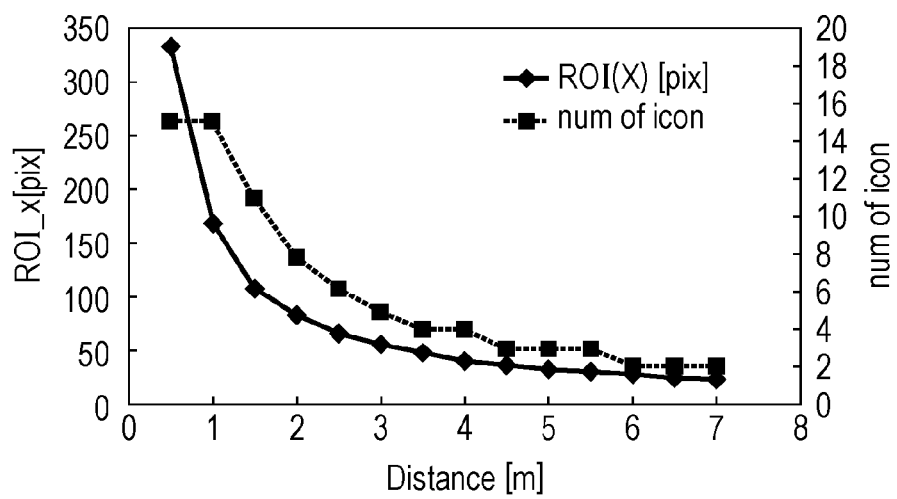
FIG. 37 is a diagram illustrating a relationship between an ROI size according to the distance from the operator and the number of menu icons on an operation screen.
Figure 38:
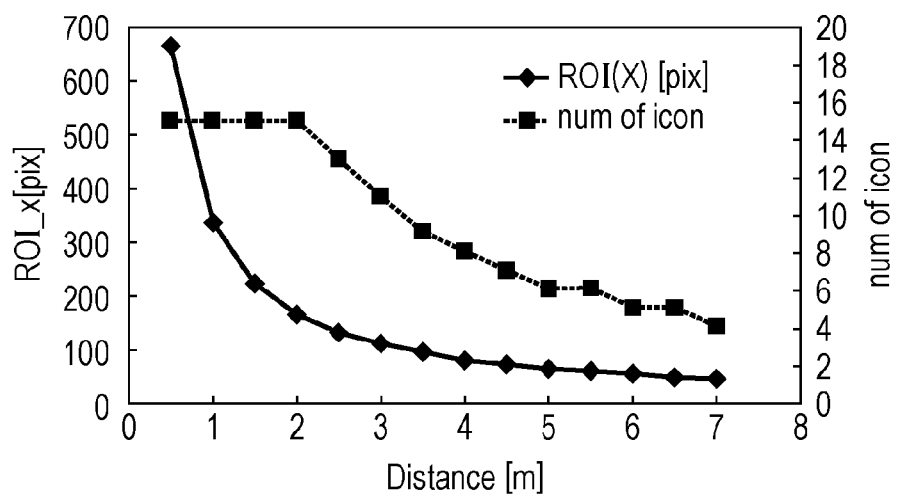
FIG. 38 is a diagram illustrating the ROI size corresponding to the distance from the operator and the number of menu icons on the operation screen.

FIGS. 37 and 38 illustrate results of calculating the size in the horizontal direction in the ROI (ROI_x) and the number of menu icons, with respect to the distance between the display control device 511 and the user. FIG. 37 illustrates a calculation result in a case that the resolution of the image sensor 23 is VGA; and FIG. 38 illustrates a calculation result in a case that the resolution of the image sensor 23 is Quad-VGA. Here, it is assumed that a maximum value of the number of menu icons is limited to 15.

For example, it is assumed that an average viewing distance of a large television set larger than 40 inches is 3 m, and when a device having a resolution of Quad-VGA is applied as the image sensor 23 of the imaging unit 51, menu icons of 10 or so are arranged in the horizontal direction on the operation screen as illustrated in FIG. 38. Further, when the viewing distance is assumed to be 5 m, six menu icons are made arranged in the horizontal direction on the operation screen.

In this manner, since the number of menu icons becomes smaller, in other words, the operation screen is displayed so that each menu icons are shown larger when the distance between the display control device 511 and the user becomes larger, the user can correctly select desired menu icons and the user operability can be improved.

Further, since each menu icon is displayed larger as the distance between the display control device 511 and the user becomes larger, legibility by the user improves and the operability can be further improved.

Here, the display control device of the present technique is made to prevent an interference by providing a method for distinguish the remote controller for operating the free-cursor (free-cursor remote controller) and an infrared light remote controller for operating another electronic device (an electronic device remote controller). For example, a wavelength of the LED of the free-cursor remote controller may be made to be a wavelength different from a wavelength of an LED of an electronic device remote controller. Concretely, the wavelength of the LED of the free-cursor remote controller is made to be 850 nm and to make the optical characteristic of the special filter 22 illustrated in the second top diagram of FIG. 4 to have a transmission band of 850 nm. When the wavelength of the LED of the electronic device remote controller is assumed to be 940 nm, an optical interference can be prevented.

Further, regarding the display control device of the present technique, an LED light source which emits an infrared light of a wavelength same as the wavelength of the infrared light emitted from the LED of the remote controller for operating the free-cursor may be provided as an illumination light. This allows monitoring of the viewing condition in a dark environment where monitoring was impossible due to a lack of sensitivity.

Further, in the second to forth embodiments, the pixel outputs explained with reference to FIGS. 17 to 20 may be applied.

The above series of processing may be executed by hardware and may be executed by software. When a series of processing are executed by software, a program configuring this software is installed from a program recording medium to, for example, a computer implemented in dedicated hardware or a general-purpose personal computer which can execute various functions by installing various programs.

Figure 39:
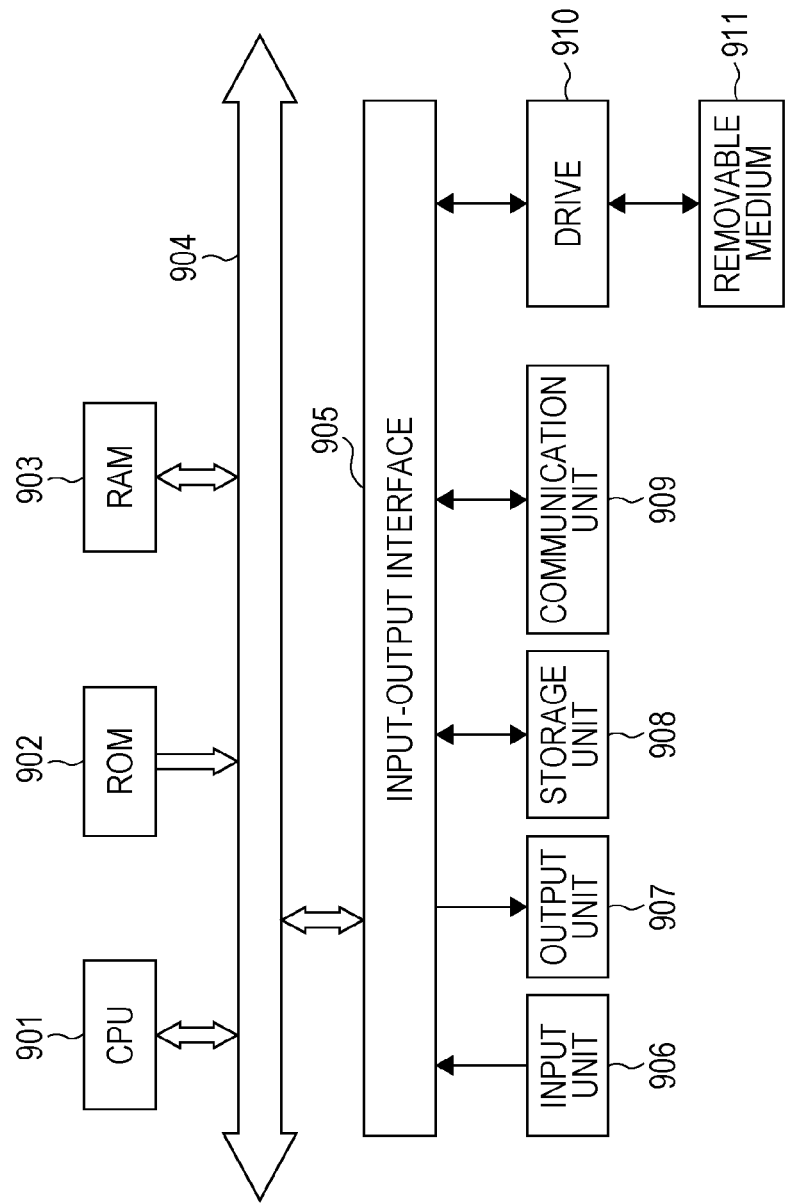
FIG. 39 is a block diagram of a hardware configuration example of a computer.

FIG. 39 is a block diagram illustrating a configuration example of hardware of a computer which executes the above series of processing by a program.

In the computer, a CPU (Central Processing Unit) 901, a ROM (Read Only Memory) 902 and a RAM (Random Access Memory) 903 are connected one another by a bus 904.

To the bus 904, an input-output interface 905 is further connected. To the input-output interface 905, an input unit 906 composed of a keyboard, a mouse, a microphone or the like, an output unit 907 composed of a display, a speaker or the like, a storage unit 908 composed of a hard disk, a non-volatile memory, or the like, a communication unit 909 composed of a network interface or the like, and a drive 910 for driving a removable medium 911 such as a magnetic disk, an optical disk, a magnetic optical disk, a semiconductor memory or the like are connected.

In the computer having the above described configuration, the series of processes are performed by the CPU 901 that loads the programs stored in the storage unit 908 to the RAM 903 via the input-output interface 905 and the bus 904 and executes it, for example.

The program that the computer (CPU 901) executes is provided by being recorded in the removable medium 911 as a transmission medium composed of, for example, a magnetic disk (including a flexible disk), an optical disk (CD-ROM (Compact Disc-Read Only Memory), a DVD (Digital Versatile Disc) or the like), a magnetic optical disk, a semiconductor memory or the like, or provided via wired or wireless transmission medium such as a local area network, the Internet, a digital satellite broadcasting.

Then, the program can be installed to the storage unit 908 via the input-output interface 905 by attaching the removable medium 911 to the drive 910. Further, the program can be received by the communication unit 909 via a wired or wireless transmission medium and installed to the storage unit 908. In addition, the program can be installed to the ROM 902 or the storage unit 908 in advance.

Here, the program which the computer executes may be a program that performs the processes in chronological order according to the order explained in the description or may be a program that performs processes in parallel or at a required timing such as when a call is performed.

Further, the embodiment of the present technique is not limited to the above described embodiments and various modifications can be made within a scope of the present technique.

Further, the present technique may be made in the following configurations.

(1) A display control device includes an imaging unit configured to output a visible light image based on a pixel signal corresponding to a visible light among light input though a lens and an infrared light image based on a pixel signal corresponding to an infrared light among light input though the lens;

an area set unit configured to set a movement area of an infrared light source in the infrared light image based on the visible light image; and a display control unit configured to control a cursor movement amount on a display unit according to movement of the infrared light source in the movement area.

(2) In the display control device according to (1), the area set unit sets a size of the movement area of the infrared light source in the infrared light image based on a subject in the visible light image and makes a position of the infrared light source to be always at the center of the movement area in the infrared light image.

(3) The display control device according to (2) further includes a face detection unit configured to detect a face of the subject in the visible light image.

The area set unit sets the size of the movement area of the infrared light source in the infrared light image based on a size of the face of the subject in the visible light image.

(4) The display control device according to (3) further includes a specifying unit configured to specify one of the subjects based on positions of the faces of the subjects in the visible light image and the position of the infrared light source of the infrared light image when more than one faces are detected by the face detection unit.

The area set unit sets the size of the movement area of the infrared light source in the infrared light image based on the size of the face of the subject specified by the specifying unit.

(5) The display control device according to (2) or (3) further includes a distance calculation unit configured to calculate a distance from the subject based on the visible light image.

The area set unit sets the size of the movement area of the infrared light source in the infrared light image based on the distance from the subject.

(6) In the display control device according to (5), the area set unit sets the size of the movement area of the infrared light source in the infrared light image based on the distance from the subject and a size of the display unit.

(7) The display control device according to one of (1) to (6) further includes an imaging control unit configured to switch parameters related to imaging by the imaging unit so as to be most suitable to the visible light image and the infrared light image respectively, which are output by the imaging unit.

(8) The display control device according one of (1) to (6) further includes an imaging control unit configured to set a parameter related to imaging by the imaging unit so as to be most suitable to the visible light image output by the imaging unit.

(9) The display control device according to (8) further includes a difference image generation unit configured to generate a difference image based on infrared light images in different time frames.

The area set unit sets the movement area of the infrared light source which makes movement in the difference image.

(10) The display control device according to one of (1) to (3) further includes a distance calculation unit configured to calculate a distance from the subject based on the visible light image.

The display control unit displays a target to be displayed on the display unit in a size corresponding to the distance from the subject and moves a cursor on the display unit according to movement of the infrared light source in the movement area.

(11) In the display control device according to one of (1) to (10), the pixel signal output as the infrared light image from the imaging unit is output from an imaging element in which a filter that transmits the infrared light is placed at one unit when four pixels of RGB pixels are assumed as one pixel unit.

(12) In the display control device according to (11), the pixel signal output as the infrared light image from the imaging unit is output from the imaging element in which the filter that transmits the infrared light is placed at one of G pixels in a Bayer array.

(13) In the display control device according to one of (1) to (10), a pixel signal output as the infrared light image from the imaging unit is output from an imaging element in which a filter that transmits the infrared light is placed at one unit when four pixels of white pixels are assumed as one unit.

(14) In the display control device according to one of (1) to (11), a wavelength of the infrared light of the infrared light source is different from a wavelength of the infrared light emitted from an LED (Light Emitting Diode) of a remote controller for operating the electronic device, and the imaging unit has a filter having a transmission band of the wavelength of the infrared light of the infrared light source.

(15) A display control method of a display control device including an imaging unit for outputting a visible light image based on a pixel signal corresponding to a visible light among light input though a lens and an infrared light image based on a pixel signal corresponding to an infrared light among light input though the lens, includes:

an area setting step setting a movement area of an infrared light source in the infrared light image based on the visible light image; and a display controlling step controlling a cursor movement amount on a display unit according to movement of the infrared light source in the movement area.

(16) In a program that makes a computer execute a display control process of a display control device including an imaging unit for outputting a visible light image based on a pixel signal corresponding to a visible light among light input through a lens and an infrared light image based on a pixel signal corresponding to an infrared light among light input through the lens, the process includes:

an area setting step setting a movement area of an infrared light source in the infrared light image based on the visible light image; and a display controlling step controlling a cursor movement amount on a display unit according to movement of the infrared light source in the movement area.

REFERENCE SIGNS LIST

11 display control device, 21 lens, 22 special filter, 23 image sensor, 23a color filter array, 53 imaging control unit, 54 RGB image processing unit, 55 face detection unit, 56 IR image processing unit, 57 bright spot extraction unit, 58 ROI set unit, 59 display control unit, 60 display unit

The invention claimed is:

1. A device comprising:
   a display unit on which can be displayed a menu of operations;
   a bandpass filter that bandpasses visible light within a range of visible wavelengths and infrared light within a range of infrared light wavelengths;
   a color filter array;
   an image sensor to receive the visible light and the infrared light after it has passed through the bandpass filter and the color filter array and output a visible light image based the visible light and an infrared light image based on the infrared light, the imaging sensor having pixels that photoconvert the visible light into the visible light image and pixels that photoconvert the infrared light into the infrared light image;
   a visible image processing unit that processes the visible light image from the imaging unit image sensor;
   an infrared image processing unit that processes the infrared light image from the image sensor;
   a bright spot extraction unit configured to determine a location of a bright spot within the infrared light image based on information from the infrared image processing unit;
   an area set unit configured to set a movement area of the bright spot in the infrared light image based on visible light information from the visible image processing unit; and
   a display control unit that controls the display unit based, at least in part, on information from the area set unit to control a cursor movement amount on a display unit according to movement of the bright spot in the movement area,
   wherein,
      the image sensor is controlled to image the visible light or the infrared light at different times and for successive frames,
      the area set unit is configured to determine if the bright spot is within a previously determined movement area for a prior frame and, (a) if it is not, to generate a larger movement area and, and (b) if it is, to determine if the bright spot has moved locations, and if the bright spot has moved locations, to generate a movement area for a succeeding frame with the bright spot positioned at the center of the movement area for the succeeding frame, and
      the display control unit is configured to move a cursor on the menu of operations according to movement of the bright spot.

2. The device according to claim 1, wherein the area set unit sets a size of the movement area of the bright spot in the infrared light image based on a subject in the visible light image and makes a position of the bright spot to be always at the center of the movement area in the infrared light image.

3. The device according to claim 2, further comprising a face detection unit configured to detect a face of the subject in the visible light image, wherein the area set unit sets the size of the movement area of the bright spot in the infrared light image based on a size of the face of the subject in the visible light image.

4. The device according to claim 3, further comprising a specifying unit configured to specify one of a plurality of subjects based on positions of the faces of the subjects in the visible light image and the position of the bright spot of the infrared light image when more than one faces are detected by the face detection unit, wherein the area set unit sets the size of the movement area of the bright spot in the infrared light image based on the size of the face of the subject specified by the specifying unit.

5. The device according to claim 2, further comprising a distance calculation unit configured to calculate a distance from the subject based on the visible light image, wherein the area set unit sets the size of the movement area of the bright spot in the infrared light image based on the distance from the subject.

6. The device according to claim 5, wherein the area set unit sets the size of the movement area of the bright spot in the infrared light image based on the distance from the subject and a size of the display unit.

7. The device according to claim 1, wherein the display control unit is configured to switch parameters related to imaging by the image sensor so as to be most suitable to the visible light image and the infrared light image respectively, which are output by the image sensor.

8. The device according to claim 1, wherein the display control unit is configured to set a parameter related to imaging by the image sensor so as to be most suitable to the visible light image output by the image sensor.

9. The device according to claim 8, further comprising a difference image generation unit configured to generate a difference image based on infrared light images in different time frames, wherein the area set unit sets the movement area of the bright spot which makes movement in the difference image.

10. The device according to claim 1, further comprising a distance calculation unit configured to calculate a distance from a subject based on the visible light image, wherein the display control unit displays a target to be displayed on the display unit in a size corresponding to the distance from the subject and moves a cursor on the display unit according to movement of the bright spot in the movement area.

11. The device according to claim 1, wherein a pixel signal output as the infrared light image from the image sensor is output from an imaging element in which a filter that transmits the infrared light is placed at one unit when four pixels of RGB pixels are assumed as one pixel unit.

12. The device according to claim 11, wherein the pixel signal output as the infrared light image from the image sensor is output from the imaging element in which the filter that transmits the infrared light is placed at one of G pixels in a Bayer array.

13. The device according to claim 1, wherein a pixel signal output as the infrared light image from the image sensor is output from an imaging element in which a filter that transmits the infrared light is placed at one unit when four pixels of white pixels are assumed as one unit.

14. The device according to claim 1, wherein:
a wavelength of the infrared light of the bright spot is different from a wavelength of an infrared light emitted from an LED (Light Emitting Diode) of a remote controller for operating the device, and
the image sensor has a filter having a transmission band for the wavelength of the infrared light of the bright spot.

15. The device of claim 1, wherein the bandpass filter only passes light having wavelengths of 400 nm to 650 nm and 940 nm.

16. A method of controlling a display device comprising (a) a display unit on which can be displayed a menu of operations; (b) a bandpass filter that bandpasses visible light within a range of visible wavelengths and infrared light within a range of infrared light wavelengths; (b) a color filter array; (c) an image sensor to receive the visible light and the infrared light after it has passed through the bandpass filter and the color filter array and output a visible light image based the visible light and an infrared light image based on the infrared light, the imaging sensor having pixels that photoconvert the visible light into the visible light image and pixels that photoconvert the infrared light not the infrared light image; (d) a visible image processing unit that processes the visible light image from the image sensor; (e) an infrared image processing unit that processes the infrared light image from the image sensor; (f) a bright spot extraction unit configured to determine a location of a bright spot within the infrared light image based on information from the infrared image processing unit; (g) an area set unit configured to set a movement area of the bright spot in the infrared light image based on visible light information from the visible image processing unit; and (h) a display control unit that controls the display unit based, at least in part, on information from the area set unit to control a cursor movement amount on a display unit according to movement of the infrared light spot in the movement area, the method comprising:
filtering light using the bandpass filter and the color filter array,
sensing the filtered light using the image sensor;
controlling the image sensor to image the visible light or the infrared light at different times and for successive frames;
determining with the area set unit if the bright spot is within a previously determined movement area for a prior frame and, (a) if it is not, to generating a larger movement area and, and (b) if it is, to determining if the bright spot has moved locations, and if the bright spot has moved locations, to generating a movement area for a succeeding frame with the bright spot positioned at the center of the movement area for the succeeding frame, and
moving with the display control unit a cursor on the menu of operations according to movement of the bright spot.

17. The method of claim 16, wherein the bandpass filter only passes light having wavelengths of 400 nm to 650 nm and 940 nm.

* * * * *